United States Patent [19]

Reik et al.

[11] Patent Number: 5,005,686
[45] Date of Patent: * Apr. 9, 1991

[54] TORQUE TRANSMITTING AND TORSION DAMPING APPARATUS FOR USE IN MOTOR VEHICLES

[75] Inventors: Wolfgang Reik, Bühl; Hans-Dieter Elison, Offenburg, both of Fed. Rep. of Germany

[73] Assignee: Luk Lamellen und Kupplungsbau GmbH, Baden, Fed. Rep. of Germany

[*] Notice: The portion of the term of this patent subsequent to Mar. 1, 2005 has been disclaimed.

[21] Appl. No.: 283,859

[22] Filed: Dec. 13, 1988

Related U.S. Application Data

[60] Division of Ser. No. 132,909, Dec. 14, 1987, abandoned, which is a division of Ser. No. 470, Jan. 5, 1987, Pat. No. 4,727,970, which is a continuation-in-part of Ser. No. 716,838, Mar. 28, 1985, abandoned, Ser. No. 799,006, Nov. 18, 1985, abandoned, and Ser. No. 848,732, Apr. 4, 1986, abandoned.

[30] Foreign Application Priority Data

Jun. 12, 1984 [DE] Fed. Rep. of Germany ....... 3421709
Nov. 23, 1984 [DE] Fed. Rep. of Germany ....... 3442679
Apr. 15, 1985 [DE] Fed. Rep. of Germany ....... 3513449
Apr. 16, 1985 [DE] Fed. Rep. of Germany ....... 3513479

[51] Int. Cl.$^5$ .................... F16F 15/12; F16D 3/12; F16D 13/72
[52] U.S. Cl. ............................. 192/70.17; 192/106.2; 192/110 B; 192/113 A; 74/574; 464/68
[58] Field of Search ............. 192/30 V, 70.17, 110 B, 192/113 A, 70.1 L, 106 L; 74/574; 464/68

[56] References Cited

U.S. PATENT DOCUMENTS

| | | | |
|---|---|---|---|
| 2,986,432 | 5/1961 | Slauch | 192/110 B X |
| 4,220,233 | 9/1980 | Ban et al. | 192/106.2 |
| 4,274,524 | 6/1981 | Nakane | 192/70.17 X |
| 4,294,343 | 10/1981 | Reh | 192/113 A |
| 4,468,207 | 8/1984 | Yoshida | 464/65 |
| 4,629,047 | 12/1986 | Lu | 192/70.12 |
| 4,727,767 | 3/1988 | Aiki et al. | 74/574 |
| 4,727,970 | 3/1988 | Reik et al. | 192/113 A X |
| 4,732,250 | 3/1988 | Maucher et al. | 192/70.17 |

FOREIGN PATENT DOCUMENTS

| | | | |
|---|---|---|---|
| 2853298 | 6/1980 | Fed. Rep. of Germany ... | 192/113 A |
| 59-151624 | 8/1984 | Japan | 192/56 R |
| 2157801 | 10/1985 | United Kingdom . | |

*Primary Examiner*—Richard Lorence
*Attorney, Agent, or Firm*—Peter K. Kontler

[57] ABSTRACT

A torsion damping apparatus between the crankshaft of the engine and the input shaft of the change-speed transmission of a motor vehicle has two flywheels one of which is driven by the crankshaft and the other of which drives the input shaft by way of a friction clutch which generates heat. In order to prevent the transfer of heat from the friction clutch to the antifriction bearing between the flywheels, which are rotatable relative to each other against the opposition of a damper, the bearing is at least partially surrounded by a thermal barrier of synthetic plastic, ceramic or metallic material which prolongs the useful life of the bearing and enhances the torsion damping action of the damper. The thermal barrier can constitute or form part of the damper. The bearing can be disposed radially inwardly of the location of engagement between the clutch and the other flywheel and can be cooled by streams of air flowing through an annulus of passages each having a first end disposed radially inwardly of the friction surface of the other flywheel and a larger second end in a second surface of the other flywheel opposite the friction surface. Heat barriers in the other flywheel can alternate with the passages in the circumferential direction of the other flywheel.

21 Claims, 8 Drawing Sheets

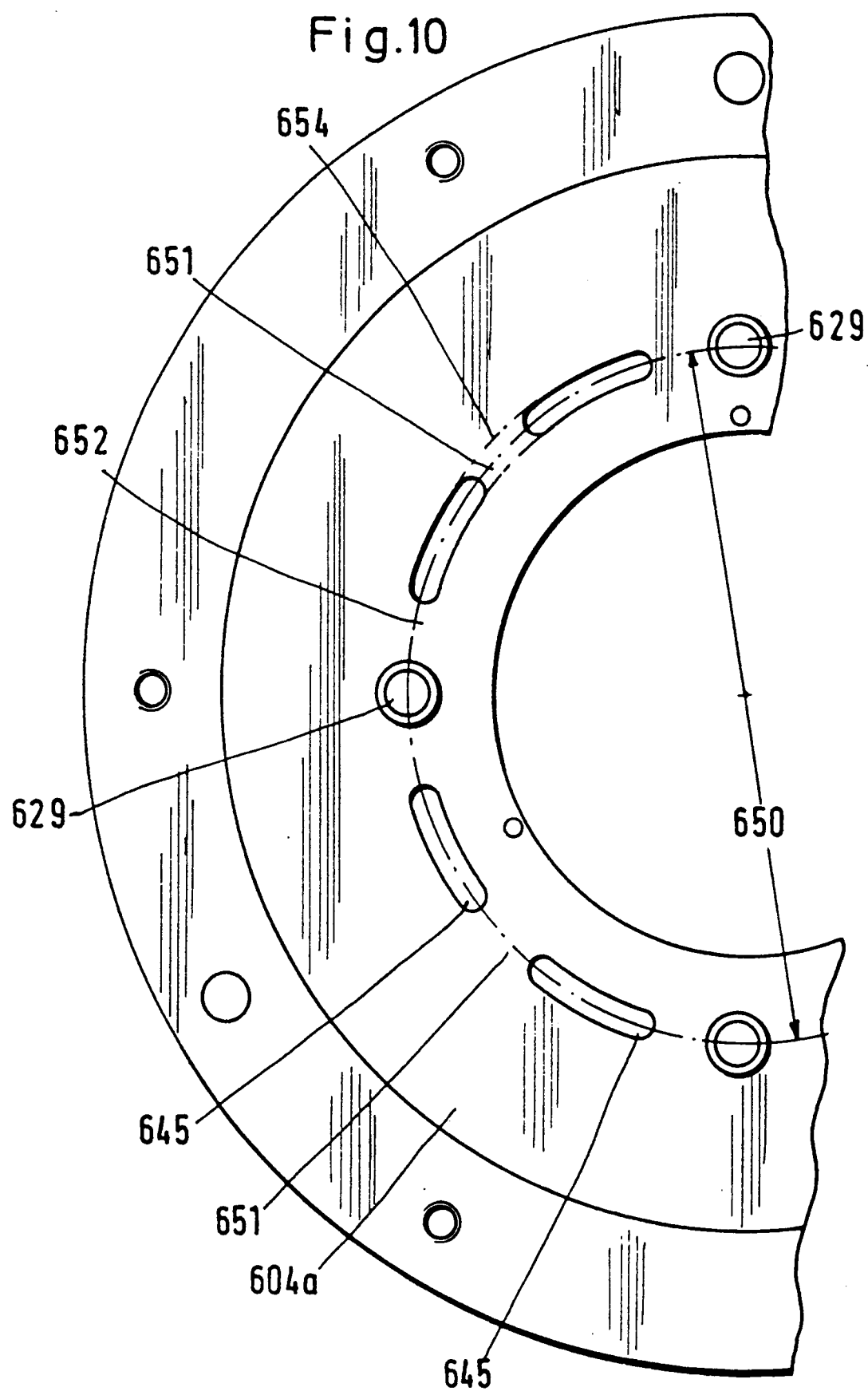

TORQUE TRANSMITTING AND TORSION DAMPING APPARATUS FOR USE IN MOTOR VEHICLES

CROSS-REFERENCE TO RELATED CASES

This is a division of abandoned patent application Ser. No. 132,909 filed Dec. 14, 1987 which is a division of Ser. No. 000,470 filed Jan. 5, 1987 (now U.S. Pat. No. 4,727,970) which is a continuation-in-part of abandoned patent applications Ser. Nos. 716,838 (filed Mar. 28, 1985), 799,066 (filed Nov. 18, 1985) and 848,732 (filed Apr. 4, 1986).

The apparatus of the present invention constitutes an improvement over and a further development of torque transmitting, torsion damping and similar apparatus which are disclosed in numerous pending United States patent applications and granted United States Letters Patent of the assignee. Reference may be had, for example, to commonly owned patent applications Ser. Nos. 661,028 (filed Oct. 15, 1984 and now U.S. Pat. No. 4,638,684), 669,658 (filed Nov. 8, 1984 and now abandoned), 669,659 (filed Nov. 8, 1984 and now abandoned), 669,769 (filed Nov. 8, 1984 and now abandoned), 669,770 (filed Nov. 8, 1984 and now abandoned), 669,768 (filed Nov. 8, 1984 and now abandoned), 717,327 (filed Mar. 29, 1985 and now abandoned), 706,498 (filed Feb. 28, 1985 and now U.S. Pat. No. 4,611,701), 745,016 (filed June 14, 1985 and now U.S. Pat. No. 4,729,464), 801,565 (filed Nov. 25, 1985 and now abandoned) and 844,475 (filed Mar. 26, 1986 and now U.S. Pat. No. 4,782,933).

BACKGROUND OF THE INVENTION

The present invention relates to torque transmitting and torsion damping apparatus, especially to improvements in torque transmitting and torsion damping apparatus which can be utilized in motor vehicles to compensate for fluctuations of torque which is transmitted between driving and driven components, particularly between the crankshaft of the internal combustion engine and the input shaft of the change-speed transmission in a passenger car or another motor vehicle.

It is already known to provide a torsion damping apparatus, which is installed in a motor vehicle between the crankshaft of the internal combustion engine and the input shaft of the change-speed transmission, with several flywheels which are rotatable relative to each other within certain limits and against the opposition of one or more dampers. Such apparatus are disclosed, for example, in commonly owned copending patent application Ser. No. 669,657 of Oswald Friedmann as well as in several other pending applications of the assignee. The flywheels can rotate relative to each other about the axis or axes of one or more bearings. A friction clutch is interposed between the last flywheel and the input shaft of the transmission, and such friction clutch includes a disc which is movable into and out of friction- and heat-generating engagement with the adjacent flywheel. This can adversely influence the operation and useful life of the bearing, especially if the races of the bearing are directly connected to or in direct contact with the adjacent flywheels. Thus, one race of an antifriction ball bearing between two coaxial flywheels which can move angularly relative to each other against the opposition of one or more dampers can be non-rotatably secured to one of the flywheels, and the other race of the bearing can be non-rotatably secured to the other flywheel. It has been found that the just described mounting of the flywheels on an antifriction bearing enables the damper or dampers to produce a highly satisfactory damping action. Nevertheless, such torsion damping apparatus failed to gain popularity in the automotive and other industries, primarily because the useful life of the bearing or bearings between the flywheels is relatively short. The bearing or bearings are one of the critical elements in these torsion damping apparatus so that their failure after a relatively short interval of use deters the manufacturers of motor vehicles from employing such torsion damping apparatus between the engine and the change-speed transmission.

A torque transmitting and torsion damping apparatus between the input shaft of a change-speed transmission and the output shaft of an engine must be capable of taking up stresses, such as those attributable to fluctuations of transmitted torque, which develop while a rotary driving element transmits torque to a rotary driven element. As a rule, or in many instances, the crankshaft of the engine is attached directly to a first flywheel, the input shaft of the transmission can receive torque from a second flywheel by way of a friction clutch, and the means for transmitting torque between the flywheels comprises one or more dampers which oppose angular movements of the flywheels relative to each other. The second flywheel has a friction surface which is engaged by a lining of the clutch disc of the friction clutch when the latter is engaged to transmit torque from the second flywheel to the transmission. The bearing or bearings between the flywheels have pairs of races confining single or multiple rows of antifriction rolling elements in the form of needles, balls, rollers or the like. The bearing or bearings enable the torque transmitting and torsion damping apparatus to perform a highly satisfactory damping of oscillations which develop in the power train between the engine and the transmission. Nevertheless, and as already stated above, such apparatus failed to gain widespread acceptance due to the short useful life of the bearing or bearings. As a rule, the bearing or bearings constitute the first part or parts which require replacement, and such replacement must take place after a relatively short period of use.

One of the main reasons that the useful life of the antifriction bearing or bearings between the flywheels of the above outlined torque transmitting apparatus is relatively short is that the bearings are subjected to pronounced thermal stresses, primarily because the friction clutch between the input element of the change-speed transmission and the respective flywheel invariably generates heat when it is called upon to transmit torque to the transmission.

The damper or dampers which are provided between the relatively movable flywheels of the just outlined torque transmitting apparatus normally comprise at least one set of coil springs or analogous energy storing elements which yieldably oppose angular movements of the flywheels relative to each other, as well as one or more friction generating devices each of which can oppose some or all angular movements of the flywheels relative to one another. The damper or dampers contribute significantly to the initial and maintenance cost of the torque transmitting apparatus.

OBJECTS AND SUMMARY OF THE INVENTION

An object of the invention is to provide a torsion damping apparatus which can be used in motor vehicles as a superior substitute for heretofore known torsion damping apparatus and is constructed, dimensioned and assembled in such a way that it and its bearing or bearings can stand long periods of use.

Another object of the invention is to provide a torsion damping apparatus wherein the bearing or bearings between the flywheels can be shielded from undesirable influences of the adjacent parts of the apparatus in a simple and inexpensive but efficient way.

A further object of the invention is to provide a torsion damping apparatus wherein the damper or dampers can perform their functions more efficiently than in heretofore known apparatus, even though their construction need not depart, or need not appreciably depart, from the construction of dampers in conventional torsion damping apparatus.

An additional object of the invention is to provide a novel and improved method of shielding the bearing or bearings and/or the damper or dampers of a torsion damping assembly from undesirable influences of other component parts of the apparatus, especially of the friction clutch between one of the flywheels and the input element of the change-speed transmission in a motor vehicle.

Still another object of the invention is to provide a torsion damping apparatus which exhibits the above outlined features but need not be bulkier, more complex and/or more expensive than heretofore known apparatus.

A further object of the invention is to provide an apparatus which is designed for controlled transmission of torque between the crankshaft of the internal combustion engine and the input shaft of the change-speed transmission in a motor vehicle and is capable of effectively opposing and damping undesirable fluctuations of torque in the power train between the engine and the wheels of the vehicle.

Another object of the invention is to provide a novel and improved method of combining the bearing or bearings with other parts of the above outlined torsion damping apparatus.

Another object of the invention is to provide novel and improved bearings for use in the above outlined torsion damping apparatus.

An additional object of the invention is to provide novel and improved flywheels for use in the above outlined torsion damping apparatus.

A further object of the invention is to provide a novel and improved method of preventing heat from adversely influencing the bearing or bearings and/or other sensitive parts of a torsion damping apparatus of the type wherein a flywheel can transmit torque to a rotary element by way of a friction clutch.

An additional object of the invention is to provide a novel and improved device for preventing heat which is generated during actual use of the torsion damping apparatus from affecting the useful life of certain sensitive parts including the bearing or bearings and one or more dampers.

Another object of the invention is to provide novel and improved means for preventing escape of lubricant from the bearing or bearings in a torsion damping apparatus of the above outlined character.

A further object of the invention is to provide a torsion damping apparatus wherein the useful life of the bearing or bearings can match the useful life of other constituents.

Another object of the invention is to provide the above outlined apparatus with novel and improved means for preventing the heat which is generated by the friction clutch from adversely influencing the bearing or bearings between the flywheels.

A further object of the invention is to provide a relatively simple, compact and inexpensive torque transmitting apparatus which can be used with particular advantage between the crankshaft of the internal combustion engine and the input element of the change-speed transmission in a motor vehicle.

An additional object of the invention is to provide a novel and improved method of shielding the bearing or bearings between the flywheels from excessive thermally induced stresses.

Still another object of the invention is to provide an apparatus of the above outlined character whose components can be assembled or taken apart in a simple and time-saving manner and which can automatically ensure uniform wear upon the component parts of the bearing or bearings between the flywheels.

A further object of the invention is to provide the apparatus with novel and improved means for damping and opposing the movements of flywheels relative to each other.

A further object of the invention is to provide a novel and improved mounting for the bearing or bearings between the flywheels as well as to provide novel and improved damper means between such flywheels.

Another object of the invention is to achieve the above-enumerated objects in a simple and inexpensive way.

Another object of the invention is to provide the apparatus with novel and improved means for prolonging the useful life of the antifriction bearing or bearings between the components of its flywheel.

A further object of the invention is to provide novel and improved means for withdrawing heat and for keeping heat away from the bearing or bearings of the above outlined apparatus.

Still another object of the invention is to provide the torque transmitting apparatus with a simple and inexpensive flywheel and with novel and improved means for cooling one or more parts of the friction clutch between the flywheel and the input shaft of the change-speed transmission.

An additional object of the invention is to provide an apparatus wherein heat is withdrawn from the friction clutch in a direction to avoid the transfer of such heat to sensitive parts of the apparatus.

A further object of the invention is to provide a power train which embodies the above outlined apparatus and to provide a motor vehicle which embodies the power train and the apparatus.

An additional object of the invention is to provide a novel and improved method of cooling the flywheel, the antifriction bearing means and/or the clutch in the above outlined apparatus.

Another object of the invention is to provide a novel distribution of heat barriers in the flywheel or flywheels of the above outlined apparatus.

An additional object of the invention is to provide a torque transmitting apparatus which is constructed and assembled in the above-outlined manner and can be installed in the power trains of existing motor vehicles.

The invention is embodied in a torsion damping apparatus which is especially suited to take up and to compensate for fluctuations of torque which is transmitted from the crankshaft of the internal combustion engine to the rotary input element of the change-speed transmission in a motor vehicle.

One embodiment of the improved torsion damping apparatus comprises a plurality of flywheels including preferably but not necessarily coaxial first and second flywheels which are movable angularly relative to each other, single or plural damper means operating between the first and second flywheels to yieldably oppose angular movements of such flywheels relative to each other, bearing means (e.g., one or more antifriction needle, ball or roller bearings with coaxial inner and outer races) which is interposed between the first and second flywheels and has at least one row of antifriction rolling elements, and a friction clutch which is operable to receive torque from one of the first and second flywheels with attendant generation of heat. The one flywheel and the friction clutch have cooperating first and second friction- and heat-generating surfaces (the first friction generating surface can constitute one side face or end face of the one flywheel, and the second surface can constitute the exposed surface of one friction lining on a clutch disc forming part of the friction clutch and serving to transmit torque to the input element of the change-speed transmission), and the improved torsion damping apparatus further comprises one or more thermal barriers and/or other suitable means for impeding (preferably blocking) the transfer of heat from the first surface to the bearing means.

The impeding means can be installed between the bearing means and the one flywheel. One race of the bearing means can be non-rotatably installed in the one flywheel, and the impeding means (e.g., a thermal barrier) can be mounted between such one race and the one flywheel.

The impeding means can contain or can consist of a synthetic plastic material, a metallic material or a ceramic material. For example, the impeding means can contain a duroplast, i.e. a thermosetting resin (e.g., a phenoplast in the form of hard paper). If the impeding means is made of or contains a thermoplastic material, such material can be selected from the group consisting of polytetrafluoroethylene, polyimide and polyamidimide. It is further possible to make the thermal barrier of a material which contains a polycarbonate, especially a fiber-reinforced polycarbonate.

The first flywheel can be formed with a central protuberance and the second flywheel is then provided with a centrally located recess which receives at least a portion of the protuberance as well as a portion of or the entire bearing means which then surrounds a portion of or the entire protuberance. The impeding means is or can be mounted in the recess and at least partially surrounds or is surrounded by the bearing means, depending upon whether the recess is provided in the one flywheel or in the other of the first and second flywheels. For example, one race of the bearing means can be arranged to rotate with the one flywheel, and the impeding means can be interposed between such race and the one flywheel so that it rotates with the one flywheel. The other race of the bearing means then surrounds the protuberance of the other of the first and second flywheels. The impeding means can be integral with the bearing means; for example, such impeding means can comprise a thermal barrier which is bonded to the bearing means in an extruding or injecting molding machine. Also, if the thermal barrier contains sintered material, such material can be integral with the bearing means. Alternatively, the thermal barrier can be a press fit on or in the bearing means. It is also possible to assemble the bearing means and the first flywheel into a prefabricated unit which fits, with a certain annular clearance, into a centrally located recess of the second flywheel and such clearance is filled with a mass of plastic material which is allowed to set and can constitute or form part of the impeding means. The hardened plastic material then surrounds the outer race of the bearing means and can be inserted into the centrally located recess of the one flywheel, i.e., of that flywheel which can transmit torque to the input element of the change-speed transmission in response to engagement of the friction clutch.

The impeding means can include or constitute a means for sealingly engaging (e.g., surrounding) at least a portion of the bearing means.

The impeding means can comprise a ring-shaped thermal barrier including a substantially cylindrical section which overlaps the first race of the bearing means, and at least one radially disposed section which extends from the cylindrical section toward the other race of the bearing means. One of the races surrounds the other race, and the cylindrical section can surround the outer of the two races. The ring-shaped thermal barrier can have a substantially L-shaped cross-sectional outline, and the radially extending section of such thermal barrier can include an annular portion (e.g., an annular marginal portion) which bears against the other race of the bearing means, as considered in the axial direction of the flywheels. The impeding means can comprise two mirror symmetrical rings each of which has an L-shaped cross-sectional outline and whose cylindrical sections surround the outer race of the bearing means. The radial sections of such rings extend from the respective cylindrical sections along the corresponding end faces of the two races, and each thereof can extend across the corresponding end of the annular clearance between the inner and outer races of the bearing means. Thus, the outer race of the bearing means is then disposed between the radial sections of the two rings which constitute or form part of the impeding means. The two rings are mirror symmetrical to each other with reference to a plane which is disposed between them and is normal to the common axis of the flywheels.

Each radial section can be biased axially of the flywheels and against the respective end face of the inner race by a diaphragm spring or by other suitable biasing means. The outer marginal portion of each diaphragm spring can react against the one flywheel, and the inner marginal portion of each diaphragm spring then bears against the radial section of the respective ring. Such inner marginal portions can cause the aforediscussed annular lips (if any) of the radial sections to bear against the respective end faces of the inner race.

A sleeve-like section of a thermal barrier which constitutes or forms part of the impeding means can be a press fit in the centrally located recess of the first or second flywheel. The sleeve-like section and the bearing means can constitute a prefabricated unit which is received in the recess. The sleeve-like section of the thermal barrier can surround the outer race of the bearing means and its thickness, as considered radially of the flywheels, can vary in the axial direction of the bearing means. At least the thicker portion of the sleeve-like section can be a press fit in the recess of the first or second flywheel.

The ring or rings of the thermal barrier can define with one of the races one or more annular chambers for suitable sealing means, such as one or more O-rings. For example, if the thermal barrier comprises a single ring having a substantially L-shaped cross-sectional outline, the cylindrical section of the ring can surround the external surface of the outer race of the bearing means, the radial section of the ring can extend from the cylindrical section inwardly along one end face of the outer race and along the corresponding end face of the inner race, and the annular chamber can be provided at the junction of the two sections, i.e., in the region where the one end face of the outer race meets the peripheral surface of the outer race. The chamber can be formed by providing the outer race of the bearing means with an annular groove. The sealing means (such as the aforementioned O-ring) can be received in the chamber and can be compressed therein by a shoulder of the outer race of the bearing means.

The thermal barrier can comprise a ring-shaped section having a frustoconical external and/or internal surface in contact with a complementary surface of the one flywheel and/or the outer race of the bearing means. Means (such as the aforementioned diaphragm spring) can be provided to bias the ring-shaped section of the thermal barrier axially in the direction of the taper of the ring-shaped section, i.e., so that the larger-diameter end of the frustoconical internal surface or the smaller-diameter end of the frustoconical external surface is the leading end of the ring-shaped section. Such section can constitute a split ring, or it can be assembled of two or more discrete arcuate sections. If the thermal barrier further comprises at least one sealing element, the latter extends radially of the ring-shaped section and toward that race of the bearing means which is not in contact with the cylindrical part of the ring. A diaphragm spring or other means can be provided to bias the sealing element axially against that race which is not engaged by the cylindrical part of the ring, for example, to bias an annular lip of the sealing element against the adjacent race of the bearing means. The ring can include a radial section which is disposed opposite the sealing element and can constitute an integral part of the cylindrical section. The radial section and the sealing element then flank the two races of the bearing means.

The means for impeding the transfer of heat to the bearing means can perform the function of or cooperates with the aforementioned damper means which yieldably opposes angular movements of the flywheels relative to each other. The clutch preferably comprises a clutch disc, and the first surface of the one flywheel is adjacent the clutch disc. The clutch also comprises means (e.g., a diaphragm spring) for biasing the first surface of the one flywheel and the clutch disc into frictional engagement with each other when the clutch is engaged whereby the clutch causes the generation of heat which is transmitted to the one flywheel. The opposing means may but need not constitute the only means which tends to resist angular movements of the flywheels relative to each other.

The bearing means can comprise an antifriction needle, ball or roller bearing having a race for the rolling elements. The race is adjacent and preferably rotates with the one flywheel, and the opposing means preferably includes a first portion (e.g., the annular portions of two mirror symmetrical rings each of which has a substantially L-shaped cross-sectional outline) which is interposed between the race and the one flywheel, and a second portion (e.g., the radially extending portions of the aforementioned rings) which is in direct or indirect frictional engagement with the other flywheel. The antifriction bearing preferably further comprises a second race which is connected to and shares the angular movements of the other flywheel. The second portion of the opposing means is or can be in direct frictional engagement with the second race. As mentioned above, the second portion of the opposing means can extend substantially radially of the flywheels and of the antifriction bearing, and the first portion of such opposing means preferably extends circumferentially of the race which rotates with the one flywheel. The radially extending portions of the rings preferably abut, or are at least adjacent, the end faces of the second race, i.e., of that race which shares the angular movements of the other flywheel.

The opposing means can further comprise one or more dished springs or analogous energy storing means for at least indirectly biasing the second portions of the rings against the other flywheel, e.g., by biasing such second portions axially of the flywheels against the end faces of the race which rotates with the other flywheel. A first portion of each dished spring can react against the one flywheel, and a second portion of each dished spring (such second portions are preferably disposed radially inwardly of the respective first portions) bears against the second portion of the corresponding ring. The distance between the second portions of the dished springs and the axes (e.g., the common axis) of the flywheels preferably equals or approximates the distance between such axes and those parts of the second portions of the rings which bear against the end faces of the second race and/or directly against the other flywheel.

The bias of one of the dished springs can exceed the bias of the other dished spring so that the rolling elements of the bearing means are clamped between the two races when the clutch is disengaged in that the second race tends to move axially with reference to the race which rotates with the one flywheel. The force which is required to disengage the clutch and acts axially of the flywheels is opposed by the one dished spring i.e., the force of the one dished spring must be overcome in order to disengage the clutch. The second portions of the rings can further serve as a means for at least substantially sealing the axial ends of the annular space which is defined by the two races of the bearing means and receives the rolling elements.

A further feature of the invention resides in the provision of an apparatus wherein the friction clutch has a clutch plate having the aforementioned second surface which is engageable with the (first) surface of the one flywheel. The damping means of such apparatus can comprise two series-connected damping units and one or more friction generating units which are interposed between the flywheels to yieldably oppose rotation of the flywheels relative to each other. The first surface and the bearing means are preferably spaced apart from each other in the radial direction of the flywheels, and the impeding means of such apparatus includes a portion of the one flywheel; to this end, the one flywheel is provided with substantially axially extending passages which are disposed intermediate the bearing means and the first surface, i.e., radially outwardly of the bearing means.

At least one passage is or can be elongated, e.g., at least one passage can constitute a slot and the passages preferably form an annulus which surrounds the bearing means.

In accordance with a presently preferred embodiment of this apparatus, each passage has a slot-shaped end portion in the first surface, and the cross-sectional area of at least one passage increases in a direction away from the first surface (preferably close to or all the way to an additional surface of the one flywheel opposite the first surface). The arrangement may be such that the internal surfaces which bound some or all of the passages resemble the surfaces surrounding fluid-circulating vanes or blades.

The passages are or can be adjacent (particularly closely adjacent) the bearing means (the latter can include one or more radial and/or axial antifriction bearings with a pair of races and needle-, roller- or ball-shaped rolling elements between the races).

Those end portions of the passages which are provided in the additional surface of the one flywheel preferably extend substantially radially outwardly away from the bearing means. The just discussed end portions of the passages can extend at least close to or all the way to and even beyond the radially outermost portion of the first surface.

The internal surfaces which bound the passages can include inner portions which are nearer to the axes of the flywheels and extend in substantial parallelism with such axes all the way between the first and additional surfaces of the one flywheel, and outer portions which are more distant from the axes of the flywheels and extend in a direction from the first surface and radially of and away from the axes of the flywheels.

The passages are, or can be, equidistant from each other in the circumferential direction of the one flywheel, and they preferably form an annulus with its center on the axes of the flywheels. The combined length of the passages (as measured in the circumferential direction of the one flywheel) can be between 20 and 70 percent of the corresponding portion of the one flywheel. The one flywheel comprises webs which alternate with the passages of the aforementioned annulus, and the width of each such web (measured in the circumferential direction of the one flywheel) can be between 0.5 and 2.5 times the width of a passage. The webs can be said to constitute, or they can be designed to constitute, heat barriers between the passages. Such heat barriers are integral portions of the one flywheel, and they cooperate with the streams of air flowing through the passages when the one flywheel rotates to prevent an overheating of the bearing means.

The damping means can comprise an annulus of rivets or analogous fasteners which are fixed to the one flywheel and alternate with the passages (as considered in the circumferential direction of the one flywheel). The fasteners can be used to attach a disc- or flange-like output member of the damping means to the one flywheel. The diameter of the annulus which is formed by the passages can closely approximate or equal the diameter of the annulus of fasteners. Such fasteners extend through at least some of the aforementioned web-like heat barriers of the one flywheel. The fasteners can alternate with pairs of passages (as considered in the circumferential direction of the one flywheel). The webs can include wider webs and narrower webs, and the fasteners are preferably secured to the wider webs. The width of each wider web can equal or approximate the combined width of the two narrower webs.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 10 is a fragmentary transverse sectional view as seen in the direction of arrows from the line X—X of FIG. 9.

DESCRIPTION OF THE PREFERRED EMBODIMENTS

Figure 1:
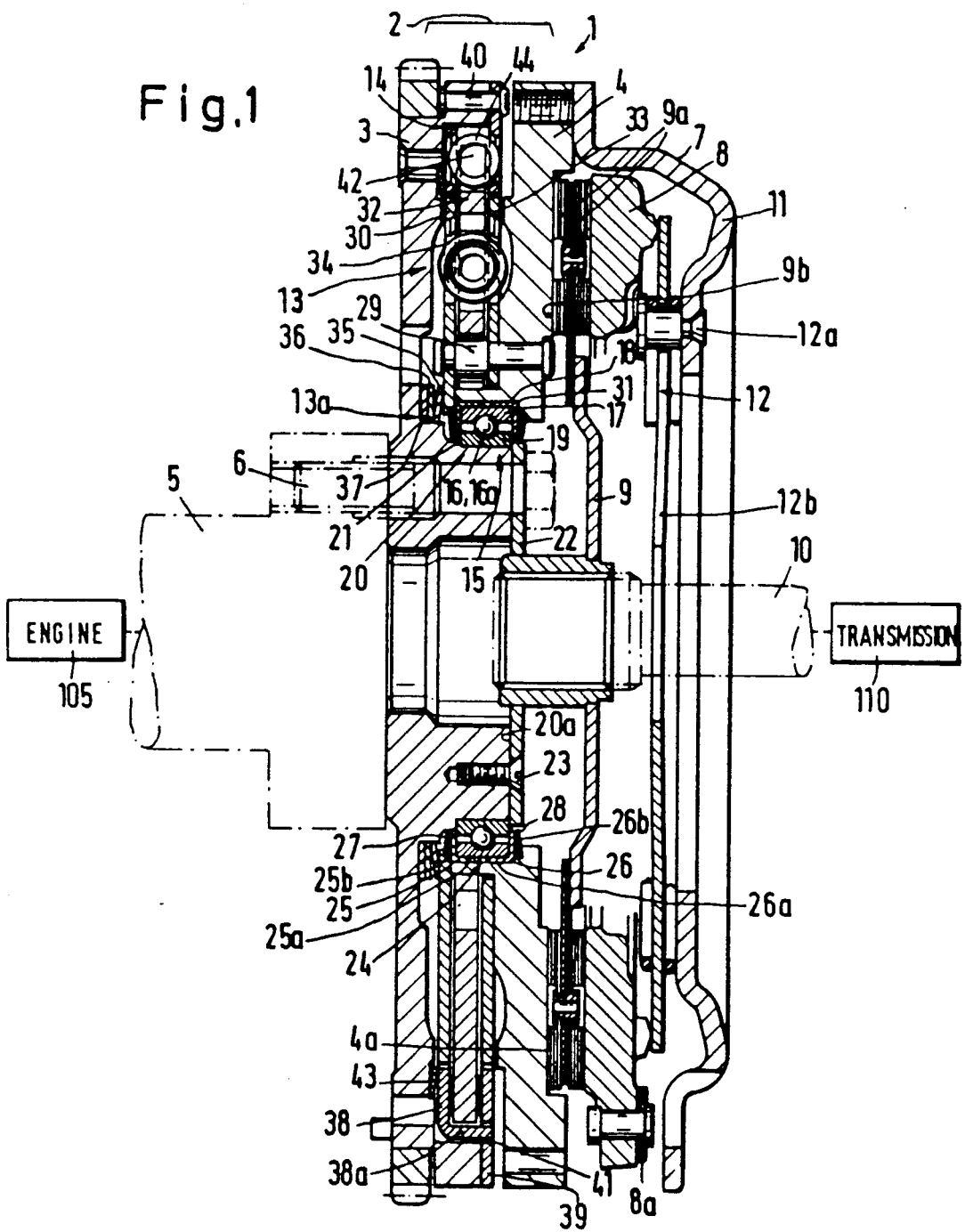
FIG. 1 is an axial sectional view of a torsion damping apparatus which is installed in a motor vehicle and wherein the means for impeding the transfer of heat from the friction clutch to one of the flywheels is constructed, assembled and mounted in accordance with a first embodiment of the invention.

The torsion damping apparatus 1 of FIG. 1 comprises a composite flywheel 2 including a first flywheel 3 receiving torque from an internal combustion engine 105 by way of a crankshaft 5 which is secured thereto by an annulus of bolts 6 or analogous fasteners, and a second flywheel 4 which transmits torque to the input element 10 of a change-speed transmission 110 in a motor vehicle by way of a friction clutch 7. The friction clutch 7 comprises an axially shiftable pressure plate 8, an axially fixed pressure plate which constitutes the second flywheel 4, a clutch plate or disc 9 with two friction linings 9a, a cover or housing 11 and a diaphragm spring 12 which normally urges the pressure plate 8 against the adjacent lining 9a so that the friction- and heat-generating (second) surface 9b of the other lining 9a bears against the adjacent friction- and heat-generating (first) surface 4a of the flywheel 4. The diaphragm spring 12 is tiltably mounted between two wire-like ring-shaped seats on the cover 11 by rivets 12a, and the axially movable pressure plate 8 is non-rotatably affixed to the flywheel 4 or to the cover 11 by leaf springs 8a. The cover 11 rotates with the flywheel 4 and with the pressure plate 8. The central portion of the clutch disc 9 transmits torque to the input element 10 of the transmission 110. The means for disengaging the clutch 7 can comprise a bearing (not shown) which can act against the radially inwardly extending prongs 12b of the diaphragm spring 12 in order to move the radially outermost portion of the diaphragm spring axially in a direction away from the flywheel 4 so that the leaf springs 8a can move the pressure plate 8 axially and away from the flywheel 4 to thus terminate the torque-transmitting connection between the flywheel 4 and the clutch disc 9, i.e., between the crankshaft 5 and the input element 10.

The flywheels 3 and 4 are or can be coaxial and can perform limited or unlimited angular movements relative to each other against the opposition of a composite damper including a damper unit 13, a friction generating unit 12a and a slip clutch 14 which is connected in series with the damper unit 13.

The torsion damping apparatus 1 further comprises a bearing means 15 which is interposed between the flywheels 3 and 4 and, in the embodiment of FIG. 1, comprises an antifriction ball bearing 16 with an inner race 19, an outer race 17 spacedly surrounding the inner race 19 and a single row or annulus of spherical rolling elements 16a in the bearing clearance between the two races. The outer race 17 is installed in a centrally located recess or bore 18 of the flywheel 4, and the inner race 19 is mounted on a centrally located cylindrical protuberance or hub 20 which is an integral part of the flywheel 3, which extends axially in a direction away from the crankshaft 5, and at least a portion of which is received in the recess 18. The inner race 19 is a press fit on the protuberance 20 of the flywheel 3 and is held against any axial movement relative to the protuberance 20 by a shoulder 21 of the flywheel 3 as well as by an annular washer-like retaining element 22 which is affixed to the protuberance 20 by screws 23 so that its left-hand end face bears against the end face 20a of the protuberance 20.

The improved torsion damping apparatus 1 further comprises means for impeding the transfer of heat from the friction- and heat-generating surfaces 9b, 4a to the bearing means 15. In the embodiment of FIG. 1, the heat transfer impeding means includes a thermal insulator or barrier 24 which is installed between the outer race 17 of the antifriction bearing 16 and the adjacent portion of the flywheel 4, namely that portion of the flywheel 4 which directly surrounds the recess 18 therein. The construction, composition and mounting of the thermal barrier 24 are such that it at least strongly interferes with and appreciably reduces the transfer of heat from the clutch disc 9 to the antifriction bearing 16. This reduces the likelihood of excessive thermal stressing of the lubricant (e.g., grease) for the antifriction bearing 16 as well as the likelihood of excessive thermally induced distortion (expansion) of the antifriction bearing 16 which could result in jamming of spherical rolling elements 16a between the races 17 and 19. The diameter of the recess 18 in the central portion of the flywheel 4 is selected in such a way that the recess can receive the outer race 17 of the antifriction bearing 16 as well as the components of the thermal barrier 24. In other words, the diameter of the recess 18 exceeds the outer diameter of the outer race 17.

The illustrated thermal barrier 24 comprises two rings 25, 26 which are mirror symmetrical to each other with reference to a plane that is disposed between them and is normal to the axes of the flywheels 3, 4 and antifriction bearing 16. Each of the rings 25, 26 has a substantially L-shaped cross-sectional outline with a cylindrical section 25a, 26a which surrounds the external surface of the outer race 17 and a radially inwardly extending washer-like section 25b, 26b which extends along the respective end face of the outer race 17 and toward and along the respective end face of the inner race 19. The radially innermost annular portions or lips of the radial sections 25b, 26b bear axially against the respective end faces of the inner race 19. Thus, the sections 25b, 26b constitute sealing elements which reduce the likelihood of penetration of foreign matter into the annular bearing clearance between the races 17, 19 as well as the likelihood of escape of lubricant from such clearance. The sealing action of radial sections 25b, 26b of the rings 25, 26 is enhanced by discrete means for biasing the radially innermost portions of such radial sections against the adjacent end faces of the inner race 19. The biasing means comprises two diaphragm springs 27, 28. The radially outermost portion of the diaphragm spring 27 reacts against a shoulder provided therefor on a disc 30 which is affixed to the flywheel 4 by rivet-shaped distancing elements 29, and the radially innermost portion of the diaphragm spring 27 bears against the radially innermost portion of the radial section 25b of the ring 25. The radially outermost portion of the diaphragm spring 28 reacts against a shoulder of the flywheel 4, and its radially innermost portion bears against the radially innermost portion of the radial section 26b of the ring 26.

In order to simplify and facilitate the assembly of the antifriction bearing 16 with the flywheels 3 and 4, the cylindrical sections 25a, 26a of the rings 25, 26 are forcibly fitted onto the outer race 17 of the antifriction bearing 16 in a first step before the bearing 16 and the rings 25, 26 thereon are forcibly inserted into the recess 18 of the flywheel 4. The bearing 16 and the rings 25, 26 are thereupon additionally secured against axial movement relative to the flywheel 4 in that the radial section 26b of the ring 26 bears against an internal shoulder 31 of the flywheel 4 and the radial section 25a of the ring 25 is caused to abut against the disc 30 which, as mentioned above, is affixed to the flywheel 4 by the distancing elements 29.

The damper unit 13 includes the disc 30 and a second disc 33 which is held at a fixed distance from the disc 30 by the aforementioned rivet-shaped distancing elements 29 which are anchored in the flywheel 4. The shanks of such distancing elements extend through a flange 32 which is disposed between the discs 30 and 33. The discs 30, 33 cannot rotate relative to each other and share all angular movements of the flywheel 4. The flange 32 shares all angular movements of the flywheel 3. The discs 30, 33 and the flange 32 are provided with neighboring windows for energy storing devices in the form of circumferentially acting coil springs 34 which oppose angular movements of the flywheels 3 and 4 relative to each other, i.e., such coil springs resist angular movements of the discs 30, 33 with reference to the flange 32 and vice versa.

The composite damper further includes the friction generating unit 12a which is active during each and every stage of angular movement of the flywheel 3 relative to the flywheel 4 and/or vice versa. The friction generating unit 12a acts axially between the disc 30 on the flywheel 4 and the flywheel 3, and includes an energy storing member in the form of a diaphragm spring 35 which is installed in prestressed condition between the disc 30 and a pressure applying washer 36. The diaphragm spring 35 can react against the flywheel 3 to bear against the washer 36 which, in turn, urges a friction ring 37 against the adjacent side of the disc 30 on the flywheel 4. The axial stress which is applied by the diaphragm spring 35 is taken up by the antifriction bearing 16.

The flange 32 constitutes the input element of the damper unit 13 as well as the output element of the slip clutch 14. The input element of the slip clutch 14 is constituted by two discs 38, 39 which are maintained at a fixed axial distance from each other and are non-rotatably secured to the flywheel 3. The means for non-rotatably securing the disc 39 to the flywheel 3 comprises an annulus of rivets 40. The disc 38 is provided with an annulus of axially extending peripheral fingers or lugs 38a which extend into adjacent peripheral notches 41 of the disc 39 so that the two discs are held against angular movement relative to one another. The flange 32 has radially outwardly extending arms 42 which are clamped between the discs 38 and 39 by a diaphragm spring 43 which urges the discs 38 and 39 toward each other. The diaphragm spring 43 reacts against the flywheel 3 and bears against the disc 38 in a direction to urge the latter axially toward the disc 39. The arms 42 of the flange 32 alternate with windows which are provided in the discs 38, 39 and receive energy storing devices in the form of coil springs 44 which can be engaged by the respective arms 42 and constitute stops that determine the extent of angular displacement of the parts of the slip clutch 14 relative to each other.

It has been found that the thermal barrier 24 between the friction clutch 7 and the bearing means 15 is capable of prolonging the useful life of the bearing means as well as of ensuring more satisfactory operation of the damper (13, 13a, 14) between the flywheels 3 and 4. This is due to the fact that the thermal barrier 24 greatly reduces the transfer of heat to the bearing means 15 even though it takes up little room and is assembled of a small number of simple, compact and inexpensive parts each of which can be mass-produced in available machinery. Extensive experiments with the improved torsion damping apparatus (wherein the bearing means is installed directly between the two flywheels 3 and 4 and wherein the angular movements of the flywheels relative to each other must be damped by one or more discrete or interlinked dampers) indicate that, in the absence of any preventive or precautionary measures, heat energy which is released when the friction clutch 7 is engaged subjects the bearing means between the flywheels to very pronounced thermal stresses which entail unsatisfactory operation and frequently rapid destruction of the bearing means as well as unsatisfactory operation of the damper or dampers. The likelihood of rapid destruction of the bearing means is especially pronounced if the bearing clearance or tolerance between the inner and outer races is small or very small. Repeated pronounced heating and cooling of the parts of such bearing means entails substantial thermally induced expansion and contraction whereby the rolling elements between the two races are likely to seize in response to expansion of the races which, in turn, entails rapid destruction of the rolling elements and of the tracks which are machined into the races. All this can be avoided by the advent of the present invention, i.e., by the provision of a thermal barrier which at least impedes the transfer of heat to the bearing means.

Another important advantage of the improved apparatus is that the lubricant (such as oil or grease) in the bearing clearance between the races of the bearing is much less likely to be overheated and to escape from the bearing. This, too, contributes to longer useful life of the bearing means and of the entire torsion damping apparatus. Moreover, portions or sections of the rings 25, 26 which constitute or form part of the improved thermal barrier 24 can serve as an effective means for sealing the bearing clearance between the races 17 and 19 to thereby even further reduce the likelihood of escape of excessive quantities of lubricant from the interior of the antifriction bearing 16. The aforediscussed plastic, ceramic and/or metallic materials have been found to constitute highly satisfactory thermal insulators which can protect the antifriction bearing 16 and the units of the composite damper for extended periods of time, even if the friction clutch 7 is continuously engaged and/or is caused or permitted to slip (with attendant pronounced generation of heat) at frequent and relatively long intervals.

It was further ascertained that the placing of the thermal barrier directly between the antifriction bearing 16 and the adjacent portion of the flywheel 4 (i.e., of that flywheel which is directly heated by the friction clutch 7) contributes significantly to adequate shielding of the bearing means 15 from excessive heat while, at the same time, allowing for relatively simple and inexpensive installation of the thermal barrier in the torsion damping apparatus. Of course, it is equally possible to employ two or more thermal barriers or to provide one or more thermal barriers in the body of the flywheel 4 and out of direct contact with the antifriction bearing 16 but in the path of transfer of heat energy from the friction generating surfaces 9b, 4a to the bearing 16.

Figure 5:
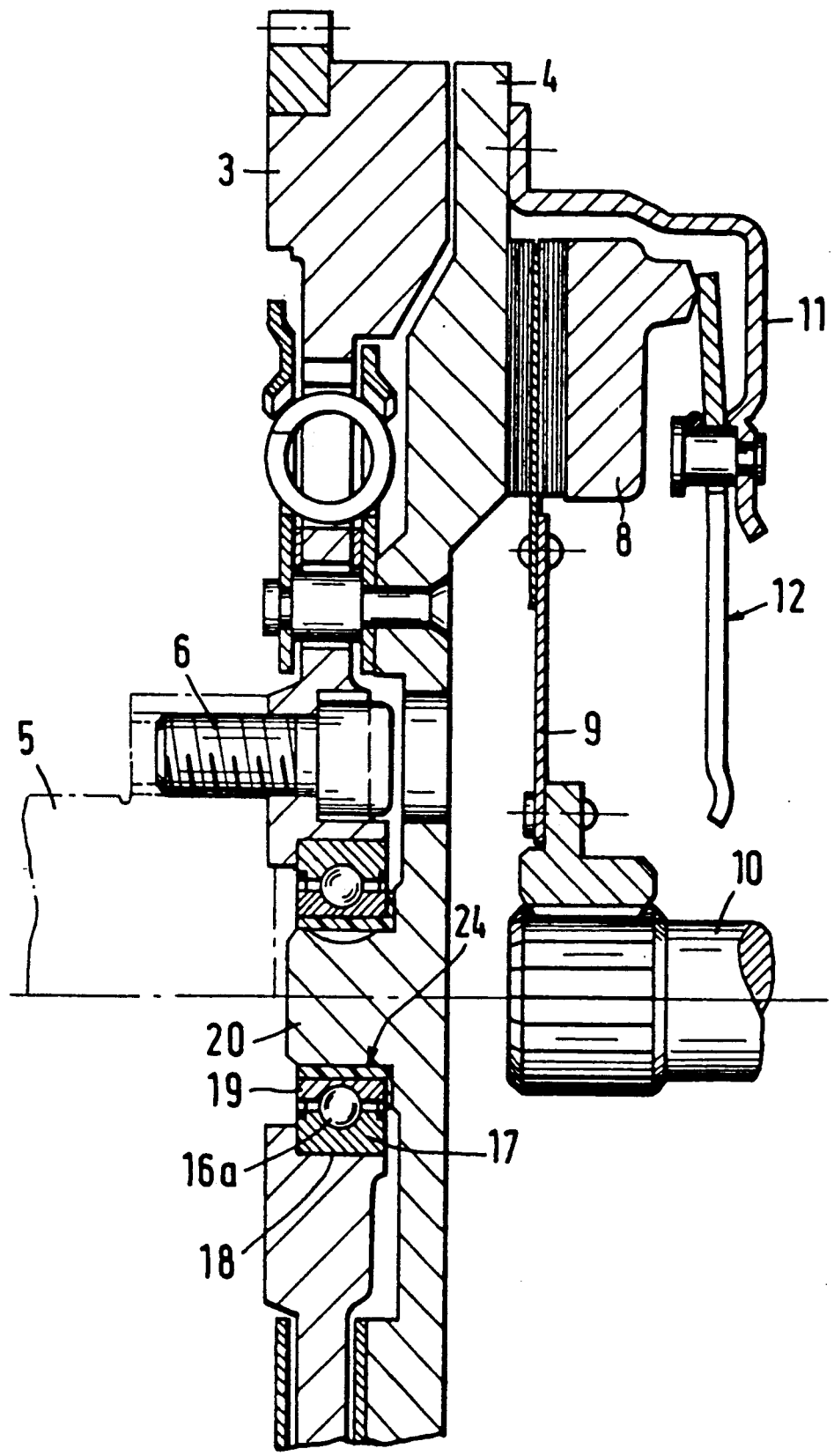
FIG. 5 is a fragmentary axial sectional view an additional apparatus wherein a thermal barrier of the means for impeding the transfer of heat is located radially inwardly of the inner race of the antifriction bearing.

The positions of the recess 18 and protuberance 20 can be reversed, i.e., the protuberance can be provided on the central portion of the flywheel 4 and the flywheel 3 is then formed with a recess which receives at least a portion of the protuberance on the flywheel 4, at least a portion of the bearing means on such protuberance and at least a portion of the thermal barrier. The thermal barrier is then preferably installed within the inner race (which surrounds the protuberance of the flywheel 4) in order to prevent overheating of the bearing means 15. This is shown in FIG. 5.

The thermal barrier 24 of FIG. 1 can be replaced with a thermal barrier which comprises a single ring having a cylindrical section which surrounds the major portion of or the entire outer race 17, and a radial section which is adjacent one end face of the race 17 and extends radially inwardly toward and at least in part along one end face of the inner race 19. The illustrated two-piece thermal barrier 24 is preferred in many instances because the two radially extending sections 25b, 26b constitute effective and relatively simple as well as compact sealing elements which prevent the escape of lubricant from the bearing clearance for the rolling elements 16a and also reduce the likelihood overheating of the confined lubricant and/or rolling elements. The provision of biasing means (such as the aforementioned diaphragm springs 27 and 28) even further reduces the likelihood of escape of excessive quantities of lubricant and/or of overheating of the lubricant and/or rolling elements in the bearing clearance between the races 17 and 19. The diaphragm springs 27, 28 can be provided even if the sections 25b and 26b are elastically deformable and the rings 25, 26 are installed in such a way that the sections 25b, 26b are prestressed and bear against the respective end faces of the inner race 19 even if the diaphragm springs 27, 28 are omitted; however, these diaphragm springs are then optional.

Figure 2:
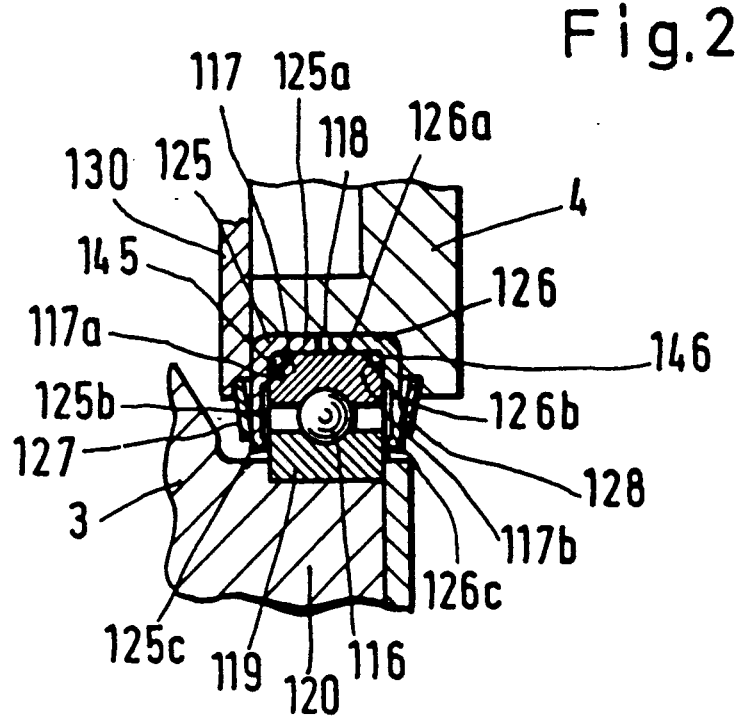
FIG. 2 is a fragmentary axial sectional view of a second torsion damping apparatus wherein the means for impeding the transfer of heat to the bearing means and one race of the bearing means define two chambers for sealing rings.

FIG. 2 shows a portion of a modified torsion damping apparatus with coaxial flywheels 3, 4, a modified bearing means having an antifriction ball bearing 116 between the two flywheels, and a modified thermal barrier between the antifriction bearing 116 and that portion of the flywheel 4 which is immediately adjacent the outer race 117 of the bearing 116. Such portion of the flywheel 4 has a recess 118 which receives a portion of the outer race 117 as well as portions of two mirror symmetrical insulating rings 125, 126 which constitute component parts of the thermal barrier. The inner race 119 of the antifriction bearing 116 is a press fit on the protuberance or hub 120 of the flywheel 3. The manner in which the flywheel 4 cooperates with the friction clutch (not shown in FIG. 2), and the manner in which the flywheel 3 receives torque from the crankshaft of the engine is or can be the same as shown in FIG. 1. The outer race 117 of the antifriction bearing 116 has circumferentially extending annular chambers in the form of grooves or recesses 117a, 117b which are overlapped in part by the cylindrical sections 125a, 126a and in part by the inwardly extending radial sections 125b, 126b of the respective rings 125, 126. Each of these rings has a substantially L-shaped cross-sectional outline, the cylindrical sections 125a, 126a engage with the peripheral surface of the outer race 117, and the radial sections 125b, 126b extend radially inwardly along the respective end faces of the races 117, 119 and have radially innermost annular portions or lips 125c, 126c which are biased axially against the adjacent end faces of the inner race 119 by two diaphragm springs 127, 128 which respectively react against the disc 130 and flywheel 4 and bear against the adjacent lips 125c, 126c. The disc 130 has a shoulder for the radially outermost portion of the diaphragm spring 127, and the flywheel 4 has a shoulder for the radially outermost portion of the diaphragm spring 128.

The chambers 117a, 117b respectively receive discrete sealing means in the form of O-rings 145, 146 which cooperate with the lips 125c, 126c and diaphragm springs 127, 128 to prevent penetration of foreign matter into the bearing clearance between the races 117, 119 as well as to prevent the escape of lubricant (e.g., grease) from such clearance. The dimensions of the chambers 117a, 117b and of the O-rings 145, 146 are selected in such a way that the O-rings are at least slightly compressed so as to reliably prevent the escape of lubricant from the clearance for the rolling elements of the antifriction bearing 116.

FIG. 2 further shows that the thickness of the intermediate portion of each of the radial sections 125b, 126b is less than the thickness of the radially outermost or the radially innermost (125c, 126c) portion of each such section. This enhances the elasticity of the radial sections 125b, 126b and enables the diaphragm springs 127, 128 to reliably hold the lips 125c, 126c in sealing contact with the adjacent end faces of the inner race 119. The cylindrical sections 125a, 126a can be a press fit in the recess 118 of the flywheel 4, and they can be assembled with the outer race 117 of the antifriction bearing 116 before the latter is fitted onto the protuberance 120 and before the protuberance 120 is introduced into the recess 118.

The diaphragm spring 127 and/or 128 can be omitted if the corresponding radial section 125b and/or 126b is sufficiently elastic to adequately bear against the respective end face of the inner race 119 when the antifriction bearing 116 is properly mounted on the protuberance 120 of the flywheel 3 and is adequately received in the recess 118 of the flywheel 4. The same applies for the radial sections 25b, 26b of the rings 25, 26 and for the diaphragm springs 27, 28 of the apparatus 1 which is shown in FIG. 1. Thus, all that is necessary is to make the rings 25, 26 and/or 125, 126 of a suitable elastomeric material and to mount these rings in such a way that their radial sections 25b, 26b and/or 125b, 126b are elastically deformed in fully assembled condition of the respective apparatus to adequately bear against the inner race 19 or 119 and to thus prevent escape of lubricant from the clearance between the races 17, 19 or 117, 119.

The O-rings 145 and 146 even further reduce the likelihood of escape of lubricant from the bearing clearance between the races 117 and 119, even if the lubricant is subjected to the action of very pronounced centrifugal forces.

Figure 3:
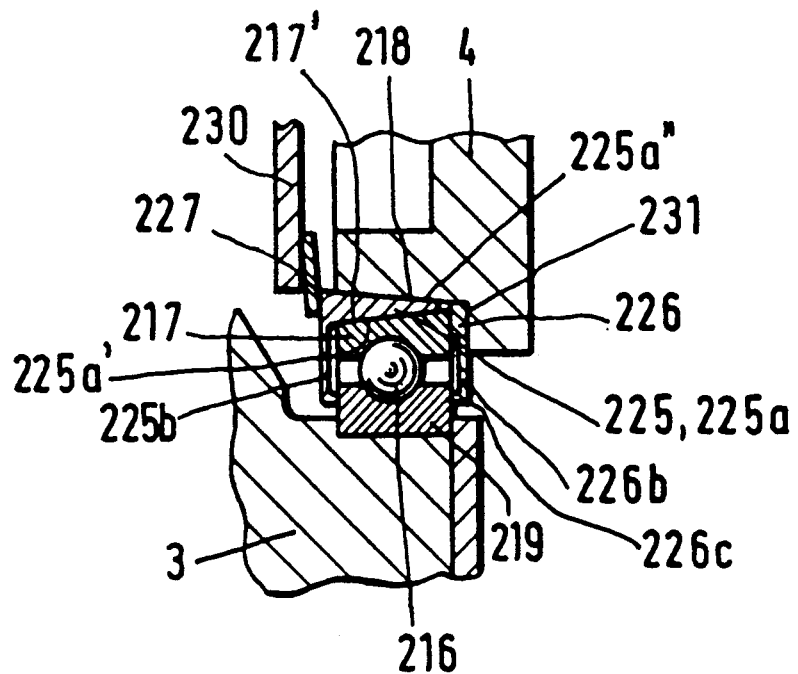
FIG. 3 is a similar fragmentary axial sectional view of a third torsion damping apparatus wherein the means for impeding the transfer of heat to the bearing means includes a single ring with a substantially L-shaped cross-sectional outline and a substantially washer-like sealing element.

Referring to FIG. 3, there is shown a portion of a further torsion damping apparatus wherein the antifriction bearing 216 between the coaxial flywheels 3 and 4 has an outer race 217 with a frustoconical external or peripheral surface 217' abutting against a complementary frustoconical internal surface 225a' of the tubular section 225a of a split ring-shaped thermal barrier 225. The section 25a has a frustoconical external surface 225a'' whose taper is counter to that of the internal surface 25a' and which is in contact with a complementary frustoconical surface in the recess 218 of the flywheel 4. The illustrated section 225a can be replaced with a section having a cylindrical internal surface and a frustoconical external surface or vice versa. The external surface of the outer race 217 or the surface in the recess 218 is then a cylindrical surface.

The diaphragm spring 227 reacts against the disc 230 and biases the ring-shaped thermal barrier 225 in the direction of taper of its frustoconical surfaces 225a', 225a'', i.e., in a direction to cause the section 225a to penetrate deeper into the recess 218.

The thermal barrier of FIG. 3 further comprises a first sealing element 226 which is a separately produced washer and extends radially inwardly from the thinnest portion of the cylindrical section 225a along the right-hand end faces of the races 217, 219 and carries at its radially innermost end an annular lip 226c which is biased against the right-hand end face of the race 219 due to innate elasticity of the sealing element 226 or due to the provision of a suitable diaphragm spring (not specifically shown). The radially inwardly extending section 225b of the ring-shaped thermal barrier 225 constitutes a second washer-like sealing element which is adjacent the left-hand end faces of the races 217, 219 and has a radially innermost portion in the form of an annular lip bearing against the adjacent end face of the race 219 under the action of the diaphragm spring 227, i.e., because the spring 227 urges the cylindrical section 225a deeper into the recess 218 of the flywheel 4. The disc 230 is affixed to the flywheel 4, e.g., in a manner as described for the disc 30 of FIG. 1. The sealing elements 226 and 225b flank the antifriction bearing 216 and reduce the likelihood of escape of lubricant from the annular clearance for the rolling elements of the bearing 216. Portions of the sealing elements 226, 225b have reduced thicknesses (see the portion 226b) to enhance their elasticity and to further reduce the likelihood of uncontrolled escape of lubricant from the clearance for the rolling elements. In lieu of spheres, the antifriction bearing 16, 116 or 216 can also employ barrel-shaped or needle-like rolling elements without departing from the spirit of the invention. Furthermore, the antifriction bearing can be provided with two or more rows of antifriction rolling elements.

The material of the ring-shaped thermal barrier 225 and of the sealing element 226 is preferably a good insulator of heat.

The torsion damping apparatus which embodies the structure of FIG. 3 exhibits the advantage that the frustoconical parts 217 and 225 compensate for certain machining tolerances and ensure automatic centering of the antifriction bearing 216 and thermal barrier when the diaphragm spring 227 is caused to bear against the left-hand side of the cylindrical section 225a and radial section or sealing element 225b. Moreover, the structure which is shown in FIG. 3 can automatically compensate for wear upon the parts of the antifriction bearing 216, upon the ring-shaped part 225 of the thermal barrier as well as upon the sealing element 226. The spring 227 ensures that the cylindrical section 225a is wedged in the recess 218 of the flywheel 4, that the outer race 217 is wedged in the cylindrical section 225a, and that the sealing element 226 is adequately held between the outer race 217 and the adjacent shoulder 231 of the flywheel 4 as well as that its lip 226c sealingly engages the right-hand end face of the inner race 219. The provision of a split ring 225 even further ensures adequate wedging of the parts 225, 217 in the recess 218 of the flywheel 4.

Figure 4:
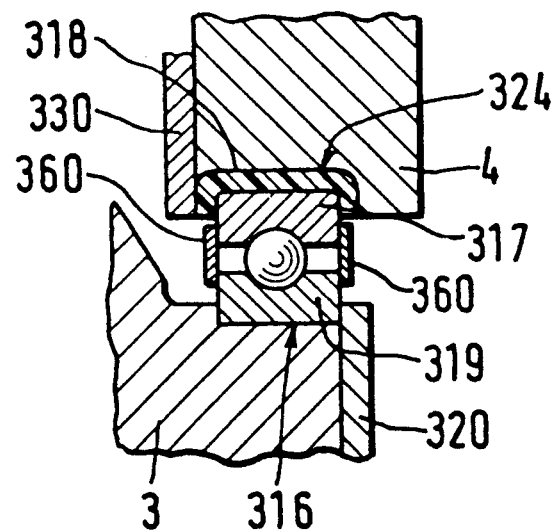
FIG. 4 is a similar fragmentary axial sectional view of a further torsion damping apparatus wherein the means for impeding the transfer of heat to the bearing means is integral with one of the flywheels and/or with the bearing.

It is further within the purview of the invention to provide the improved torsion damping apparatus with a thermal barrier which need not include any prefabricated parts in the form of rings and/or washer-like sealing elements. For example, and as shown in FIG. 4, the thermal barrier 324 can constitute a single piece of thermoplastic or thermosetting material which is injected into the recess 318 of the flywheel 4 around the outer race 317 of the antifriction bearing 316. All that is necessary is to dimension the outer race 317 and the recess 318 in such a way that the surfaces bounding the recess and the surfaces bounding the outer race define an annular space or compartment which can receive flowable plastic material. When the plastic material sets, the resulting thermal barrier 324 adequately fills the space between the race 317 and the surfaces surrounding the recess 318 and impedes or totally prevents the transfer of heat from the clutch disc (not shown) to the antifriction bearing 316. The illustrated plastic thermal barrier 324 can be replaced with a barrier which consists of sintered ceramic or metallic material. In each instance, the thermal barrier is an integral part of the antifriction bearing 316 and/or of the flywheel 4. It is also possible to apply an integral plastic, ceramic or metallic thermal barrier to the inner race and/or outer race of the antifriction bearing 316 before the latter is inserted into the recess 318 or to apply the thermal barrier to the surfaces bounding the recess 318 (so that the thermal barrier becomes an integral part of the flywheel 4) before the antifriction bearing 316 is inserted into the thus obtained thermal barrier in the recess 318.

The injection or another mode of introduction of a flowable plastic, metallic or ceramic material into the space between the surfaces bounding the recess 318 of the flywheel 4 and the exterior of the antifriction bearing 316 is especially advantageous and desirable if the bearing 316 is a commercially available antifriction bearing which is already provided with sealing elements 360 that prevent uncontrolled escape of lubricant from the space between the two races. As mentioned above, all that is necessary is to adequately select the dimensions of the surfaces bounding the recess 318 so as to provide sufficient room for introduction of a flowable material which is to form the thermal barrier 324 and is to be integral with the outer race 317 and/or with the flywheel 4.

The disc 330 is applied subsequent to introduction of the outer race 317 into the recess 318, and the disc 320 is attached to the flywheel 3 to hold the inner race 319 against axial movement.

Figure 6:
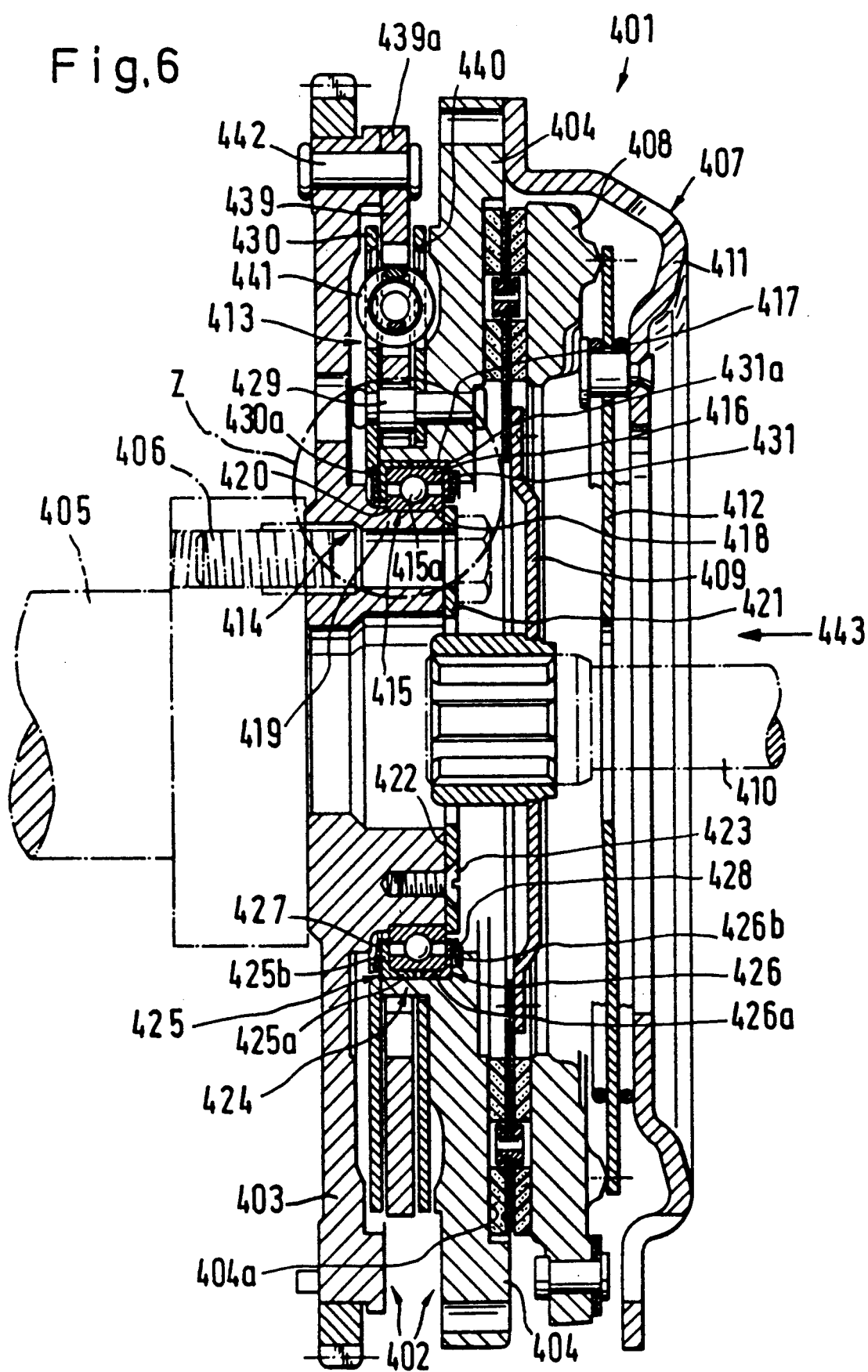
FIG. 6 is an axial sectional view of a further torque transmitting apparatus which embodies the invention, the output element of an integral combustion engine and the input element of a change-speed transmission being indicated by phantom lines.
Figure 7:
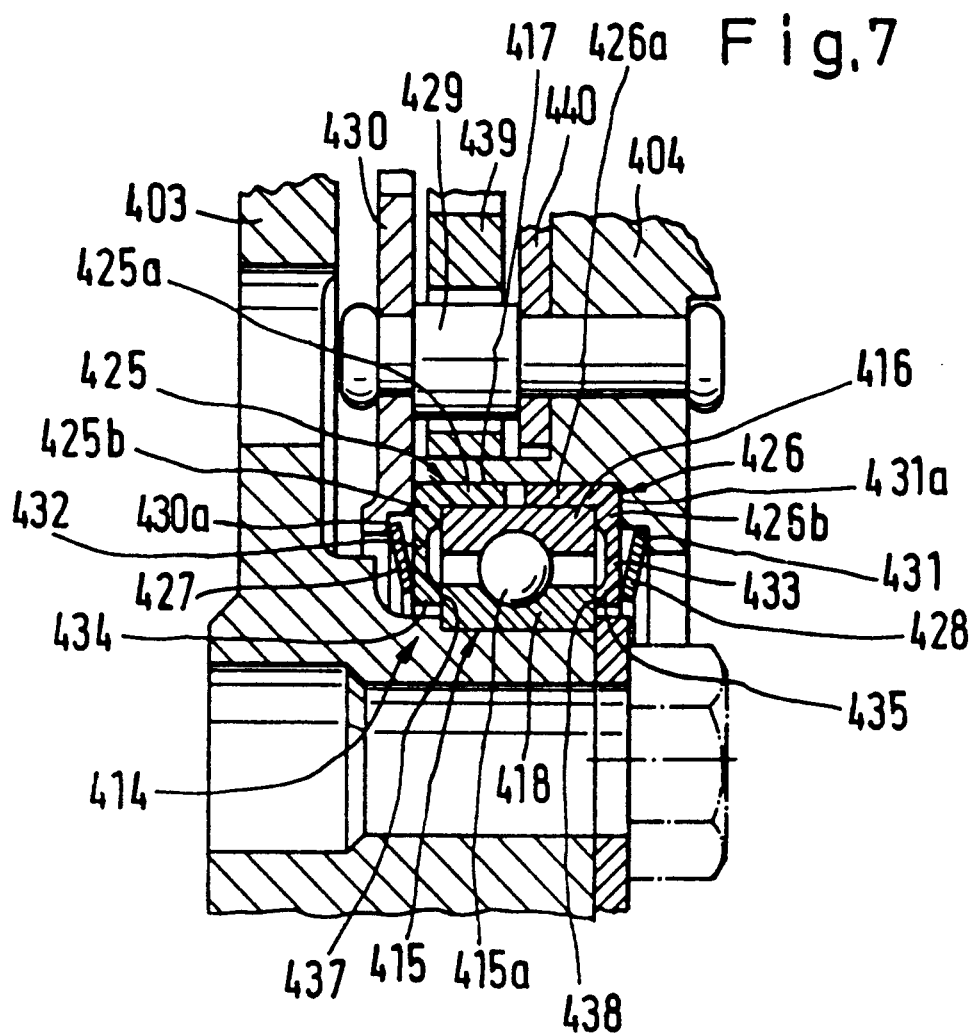
FIG. 7 is an enlarged view of a detail within the phantom-line circle Z of FIG. 6.

Referring to FIGS. 6 and 7, there is shown an apparatus 401 which transmits torque from a rotary output element 405 (such as the crankshaft of an internal combustion engine in a motor vehicle) to a rotary input element 410 (e.g., the input shaft of a change-speed transmission in a motor vehicle). In order to render it possible to absorb shocks which develop during transmission of torque, the apparatus 401 comprises a composite flywheel 402 having two coaxial flywheels 403 and 404 which have limited or full freedom of angular movement relative to each other. The flywheel 403 is coaxially secured to the output element 405 by a set of bolts 406 or by other suitable fasteners. The flywheel 404 can transmit torque to the input element 410 by way of a friction clutch 407 whose housing or cover 411 is secured to the flywheel 404 by bolts, screws or like fasteners, not shown. The clutch 407 further comprises a pressure plate 408, a clutch disc 409 whose linings are disposed between a radially extending surface 404a of the flywheel 404 and the pressure plate 408 and whose hub is non-rotatably affixed to the input element 410, and a diaphragm spring 412 which reacts against the cover 411 and bears against the pressure plate 408 to bias the latter against the respective friction lining whereby the other friction lining bears against the surface 404a and the flywheel 404 rotates the input element 410 as long as the friction clutch 407 remains engaged. The diaphragm spring 412 is installed between two ring-shaped seats in the form of wire rings which are supported by the cover 411.

A damper 413 is installed between the flywheels 403 and 404 to yieldably oppose the aforementioned angular movements of the flywheels relative to each other. The apparatus 401 further comprises antifriction bearing means 414 here shown as comprising a ball bearing 415 with a single row of spherical rolling elements 415a between an outer race 416 and an inner race 418. The race 416 extends into an internal annular groove 417 of the flywheel 404, and the race 418 surrounds a hub-shaped central portion or protuberance 419 of the flywheel 403. The protuberance 419 extends axially of the flywheel 404 in a direction away from the output element 405.

The inner race 418 is a press fit on the protuberance 419 and is held against axial movement on such protuberance by a radially outwardly extending shoulder 420 of the flywheel 403 in cooperation with a washer-like retainer 421 which abuts the adjacent end face 422 of the protuberance 419 and is separably affixed to the latter by screws 423 or by analogous fastener means.

In accordance with a feature of the embodiment of FIGS. 6 and 7, the apparatus 401 further comprises a thermal barrier 424 which is interposed between the race 416 of the ball bearing 415 and the flywheel 404 so as to impede or fully prevent the transmission of heat which is generated primarily as a result of frictional engagement of the clutch plate 409 with the surface 404a of the flywheel 404 when the friction clutch 407 is operative to transmit torque from the flywheel 404 to the input element 410 of the change-speed transmission. The purpose of the thermal barrier 424 is to prevent heat, which is generated in response to engagement of the friction clutch 407, from adversely influencing (i.e., from exerting excessive thermal stresses upon) the lubricant (grease) which is used for the rolling elements 415a of the ball bearing 415. Furthermore, the barrier 424 prevents excessive thermally induced deformation and radial expansion of the bearing 415 when the left-hand lining of the clutch disc 409 is in frictional engagement with the surface 404a of the flywheel 404. Excessive radial expansion of the races 416 and 418 could entail a jamming of the rolling elements 415a between the races. The diameter of the surface in the deepmost portion of the recess 417 in the flywheel 404 is selected in such a way that certain parts of the thermal barrier 424 can be installed in such recess and surround the outer race 416 of the antifriction bearing 415.

As can be best seen in FIG. 7, the thermal barrier 424 comprises two substantially or exactly mirror symmetrical rings 425, 426 each of which has a substantially L-shaped cross-sectional outline. The axially extending (annular) portions or legs 425a, 426a of the rings 425, 426 are radially outwardly adjacent the outer race 416 of the ball bearing 415, and the radially inwardly extending (washer-like) portions or legs 425b, 426b of these rings flank the respective end faces of the race 416 and have radially innermost parts or lips 434, 435 which abut the respective end faces 437, 438 of the inner race 418 to thereby oppose angular movements of the race 418 and flywheel 403 relative to the race 416 and flywheel 404. Thus, the lips 434, 435 form part of the thermal barrier 424 as well as of the aforementioned damper 413 between the flywheels 403 and 404.

The radially extending legs 425b, 426b of the rings 425, 426 perform the additional function of confining the lubricant (normally grease) for the rolling elements 415a in the space between the races 416 and 418 of the ball bearing 415. The damping and confining or sealing action of the legs 425b, 426b can be enhanced and maintained at a selected optimum value or within a predetermined optimum range by the provision of means for biasing the lips 434, 435 against the respective end faces 437, 438 of the inner race 418. Such biasing means comprises a first dished spring 427 whose radially outermost portion reacts against an internal shoulder 430a of a disc 430 and whose radially innermost portion bears against the lip 434 of the leg 425b, and a second dished spring 428 whose radially outermost portion reacts against an internal shoulder 431 of the flywheel 404 and whose radially innermost portion bears against the lip 435 of the leg 426b. The disc 430 is affixed to the flywheel 404 by a set of rivets 429.

FIG. 7 shows that the thickness of the median portions of the legs 425b, 426b is reduced so that such median portions constitute two relatively thin and hence more readily flexible membranes 432, 433. The lips 434, 435 are disposed radially inwardly of the respective membranes 432 and 433 and bear against the respective end faces 437 and 438 of the inner race 418 with a force which is determined by the bias of the respective dished springs 427 and 428. The initial stressing of the dished springs 427 and 428 is selected in such a way that the axially oriented force which is applied by the spring 428 exceeds the axially oriented force which is applied by the spring 427. This ensures that the races 416 and 418 tend to move axially and in opposite directions whenever the friction clutch 407 is idle whereby the rolling elements 415a are clamped between the two races. The inner race 418 tends to move to the left, as viewed in FIG. 7, because the bias of the dished spring 428 prevails over that of the dished spring 427.

In order to simplify the assembly of the thermal barrier 424 with the antifriction bearing 415, the annular portions 425a, 426a of the rings 425, 426 are first force-fitted onto the peripheral surface of the outer race 416 before the rings 425, 426 are introduced into the recess 417 of the flywheel 404. The antifriction bearing 415 is maintained in a predetermined axial position with reference to the flywheel 4 because the outer side of the properly installed radially extending leg 426b abuts an internal shoulder 431a of the flywheel 404 and the radially outermost portion cf the outer side of the leg 425b abuts the adjacent side of the aforementioned disc 430.

The damper 413 between the flywheels 403 and 404 further comprises the aforementioned disc 430 as well as a second disc 440 whose inner diameter is larger than that of the disc 430. The rivets 429 are configurated in such a way that they maintain the discs 430, 440 at a fixed axial distance from the surface 404a of the flywheel 404 as well as from each other. The discs 430, 440 flank (i.e., they are disposed at the opposite sides of) a flange 439 whose radially outwardly extending prongs 439a are secured to the flywheel 403 by rivets 442. The flange 439 and the discs 430, 440 have registering windows for energy storing elements in the form of coil springs 441 whose function is to oppose angular movements of the discs 430, 440 and flange 439 relative to each other.

The arrow 443 denotes in FIG. 6 the direction in which the tips of the radially inwardly extending fingers of the diaphragm spring 412 must be shifted in order to move the radially outermost portion of the diaphragm spring axially and away from the flywheel 404 in order to disengage the friction clutch 407. The force which is applied in the direction of the arrow 443 must overcome the force with which the prestressed spring 412 urges the pressure plate 408 against the respective friction lining of the clutch disc 409. The bias of the springs 427, 428 is selected in such a way that the resulting axial force acting upon the race 418 (namely the difference between the axially applied larger force of the spring 428 and the axially applied smaller force of the spring 427) is smaller than the force which must be applied in the direction of the arrow 443 in order to disengage the clutch 407. This ensures that the spring 428 ceases to urge the inner race 418 axially relative to the outer race 416 when the friction clutch 407 is engaged to transmit torque from the flywheel 404 to the input element 410 of the change-speed transmission. In other words, the rolling elements 415a are not clamped between the races 416 and 418 when the flywheels 403, 404 are to transmit torque from the output element 405 to the input element 410. The just discussed selection of the bias of the springs 412, 427, 428 and of the force which must be applied in the direction of the arrow 443 is desirable and advantageous because this ensures that the rolling elements 415a come into contact with different portions of the tracks which are defined by the races 416 and 418 and also that the angular positions of the rolling elements 415a change with attendant reduction of pronounced localized wear upon the antifriction bearing 415 and the longer useful life of the torque transmitting apparatus 401.

The extent to which the flywheels 403 and 404 can turn relative to each other is determined by the length of circumferentially extending slots in the flange 439. Such slots receive portions of the respective rivets 429.

Figure 8:
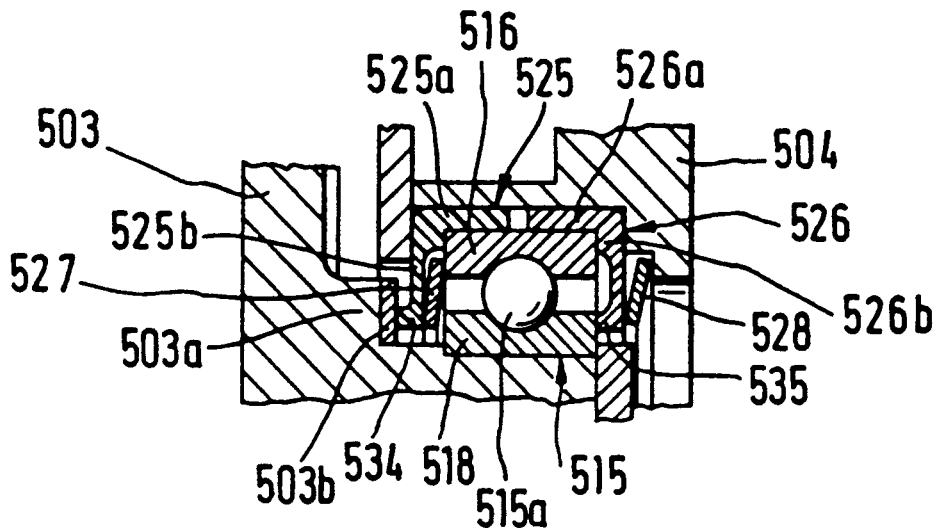
FIG. 8 is a similar enlarged view of a detail in a modified torque transmitting apparatus.

FIG. 8 shows a portion of a modified torque transmitting apparatus wherein the dished spring 527 which bears upon the bead 534 reacts against the corresponding end face of the outer race 516 and urges the bead 534 against a friction generating washer 503b so that the latter bears against a shoulder 503a of the flywheel 503. Thus, the spring 527 is disposed between the median portion or membrane of the radially extending leg 525b of the ring 525 and the respective end faces of the races 516 and 518. The washer 503b can be made of steel and is preferably mounted in such a way that it cannot rotate relative to the flywheel 503. The construction which is shown in FIG. 8 ensures that the axially oriented force which is generated by the spring 527 is added to the axially oriented force which is generated by the spring 528 so as to urge the inner race 518 axially of the outer race 516 when the friction clutch (not shown in FIG. 8) is disengaged i.e., the races 516 and 518 then clamp the rolling elements 515a of the antifriction bearing 515. The leg 525b is integral with the axially extending annular leg 515a of the ring 525. The ring 526 has an axially extending portion 526a and the radially extending leg 526b with bead 535. The rings 525, 526 are installed in the flywheel 504.

An important advantage of the torque transmitting apparatus of FIGS. 6–8 is that the thermal barrier 424 of FIGS. 6–7 or the barrier of FIG. 8 can also serve as (or as a component part of) a means for opposing angular movements of the flywheels 403 and 404 or 503 and 504 relative to each other. This contributes to simplicity, compactness and lower cost of the apparatus. The rings 425, 426 or 525, 526 and the springs 427, 428 or 527, 528 can constitute the sole means for frictionally damping the angular movements of the flywheel 403 or 503 relative to the flywheel 404 or 504 and/or vice versa. This entails a substantial reduction of the overall number of component parts of the torque transmitting apparatus and simplifies the assembly and/or dismantling of such apparatus. If the improved thermal barrier 424 or the barrier of FIG. 8 constitutes the sole means for frictionally damping the angular movements of the flywheels 403 or 503 and 404 or 504 relative to each other, the conventional damper or dampers can be omitted in their entirety. On the other hand, if the apparatus comprises one or more conventional dampers plus the thermal barrier which also serves as or includes a means for opposing angular movements of the flywheels 403, 404 or 503, 504 relative to each other, the damping action can be enhanced by a unit (the improved torque transmitting apparatus) which also performs another important, desirable and advantageous (thermal insulating) function. It has been found that the improved thermal barrier (either alone or in combination with one or more conventional dampers) can ensure an ideal or nearly ideal progress of the damping action. Proper thermal insulation of the lubricant (normally grease) in the annular space between the races 416, 418 or 516, 518 of the antifriction bearing 415 or 515 contributes significantly to a longer useful life of the entire apparatus, and such insulation also reduces the need for frequent inspection of the bearing. Proper lubrication of the tracks which are defined by the races 416, 418 or 516, 518 and of the rolling elements 415a or 515a is one of the most important factors insofar as the useful life of the bearing means (and hence of the entire torque transmitting apparatus) is concerned.

The apparatus of FIGS. 6–8 can be simplified still further by omitting the spring 427 and/or 428 of FIGS. 6–7 and/or the spring 527 and/or 528 of FIG. 8. All that is necessary is to ensure that the rings 425, 426 or 525, 526 are made of a material which exhibits a requisite degree of springiness so that the radially extending arms 425b, 426b or 525b, 526b bear against the respective end faces of the race 418 or 518 and/or directly against the flywheel 403 and/or against a part (such as 503b) which rotates with the flywheel 503 when the improved thermal barrier is properly installed between the friction clutch and the bearing 415 or 515, normally between the flywheel 404 or 504 and the respective race (416 or 516) of the bearing means. The utilization of dished springs or otherwise configurated biasing means is often preferred because such springs ensure a more predictable generation of friction between the ring or rings of the thermal barrier and the flywheel 403 or 503. The springs 427, 428 or FIG. 7 further ensure an even more reliable sealing of both axial ends of the annular space which is defined by the races 416, 418 and serves for reception of the rolling elements 415a.

The improved thermal barrier can operate satisfactorily with a single ring 425, 525 or 426, 526. The utilization of two rings is preferred at this time because two rings ensure a more satisfactory sealing of the aforediscussed annular space between the races 416, 418 or 516, 518, because two rings can establish a highly satisfactory thermal barrier between the flywheel 404 or 504 and the bearing 415 or 515, and also because two rings (especially when used with two discrete dished springs or the like) can provide a highly satisfactory damping action by opposing the angular movements of the flywheels 403, 404 or 503, 504 relative to each other.

Figure 9:
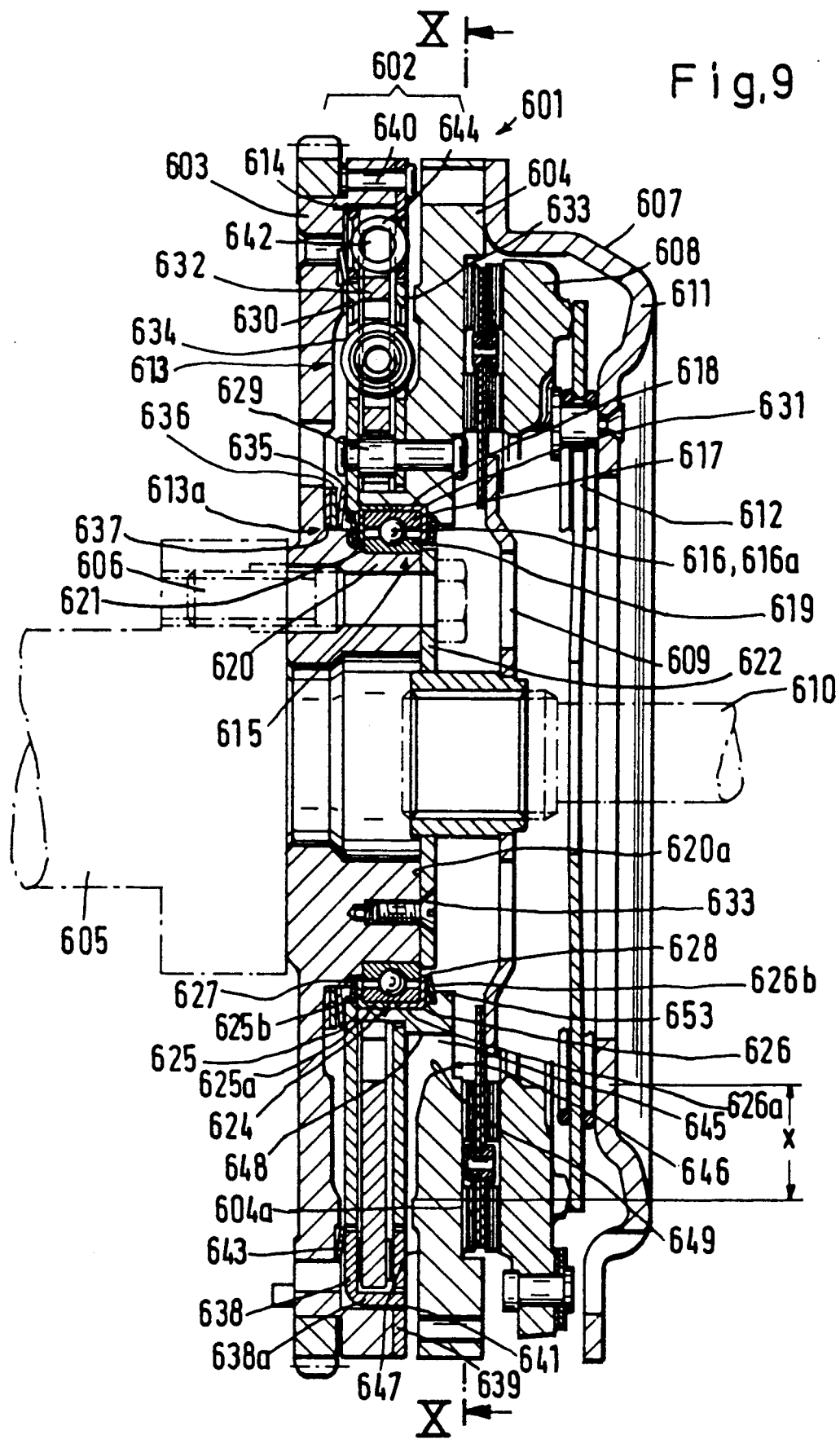
FIG. 9 is an axial sectional view of a further apparatus which embodies the invention.

FIGS. 9 and 10 show an apparatus 601 for controlled transmission of torque from the crankshaft 605 (indicated by phantom lines) of the internal combustion engine to the input shaft 610 (shown by phantom lines) of the change-speed transmission in a motor vehicle. The apparatus 601 comprises a composite flywheel 602 including coaxial first and second components 603, 604 which are rotatable relative to each other within predetermined limits. The component 603 is coaxially secured to the crankshaft 605 by a set of bolts 606, and the component 604 carries the housing or cover 611 of a friction clutch 607 whose clutch disc or clutch plate 609 has a hub which is non-rotatably secured to the input shaft 610. The component 603 drives the input shaft 610 in response to engagement of the clutch 607 in a manner not forming part of the present invention. FIG. 9 shows an axially movable pressure plate 608 which is normally biased toward the component 604 by a diaphragm spring 612 tiltably mounted at the inner side of the housing 611. The clutch plate 609 carries linings which are in frictional engagement with the adjacent surface of the pressure plate 608 and with an annular friction surface 604a of the component 604 when the clutch 607 is engaged, namely when the component 603 drives the input shaft 610 through the medium of the component 604 and clutch plate 609.

The apparatus 601 further comprises means for yieldably opposing angular movements of the components 603 and 604 relative to each other. Such opposing means comprises a first damping unit 613, a second damping unit 614 in series with the unit 613, and a friction generating device 613a. The exact construction of the units 613, 614 and friction generating device 613a forms no part of the present invention. Reference may be had to the aforementioned copending applications of the assignee and to the embodiments of FIGS. 1–8.

The apparatus 601 still further comprises bearing means 615 including at least one radial antifriction bearing 616 having an outer race 617, an inner race 619 and an annulus of spherical rolling elements 616a between the two races. The outer race 617 is disposed in an axial recess or bore 618 of the component 604, and the inner race 619 is preferably a press-fit on a centrally located cylindrical protuberance 620 of the component 603. The protuberance 620 extends axially in a direction away from the crankshaft 605 and into the bore 618 of the component 604. The inner race 619 abuts a stop in the form of a shoulder 621 of the protuberance 620 and is held against axial movement away from such shoulder by a disc-shaped retainer 622 which is secured to the adjacent end face 620a of the protuberance 620 by a set of screws 623 or other suitable fasteners.

The apparatus 601 also comprises a number of means for impeding or preventing the transmission of heat between the friction surface 604a and the radial antifriction bearing 616. The latter is disposed radially inwardly of the friction linings on the clutch plate 609. One of the heat transmission preventing or impeding means comprises a thermal barrier or insert 624 composed of two coaxial rings 625 and 626 each having a substantially L-shaped cross-sectional outline. The axially extending (cylindrical) portions 625a, 626a of the rings 625, 626 surround the major part of the external surface of the outer race 617 and are received in the bore or socket 618 of the second component 604. The radially extending (washer-like) portions 625b, 626b of the rings 625, 626 are adjacent the respective end faces of the races 617, 619 and are biased against the corresponding end faces of the inner race 619 by energy storing elements in the form of diaphragm springs 627, 628, respectively. The radially extending portions 625b, 626b not only intercept some of the heat but also serve to seal the space between the races 617, 619 so as to prevent uncontrolled escape of grease for the rolling elements 616a. The radially outermost portion of the diaphragm spring 627 reacts against a shoulder of a disc 630 which is affixed to the component 604 by rivets 629, and the radially innermost portion of the spring 627 bears against the radially innermost part of the portion 625b. The diaphragm spring 628 has a radially outermost portion which reacts against an internal shoulder of the component 604 and a radially innermost portion which bears against the radially innermost part of the portion 626b. The diameter of the surface surrounding the bore 618 is sufficiently large to allow for the placing of rings 625, 626 onto the outer race 617 in a manner as shown in FIG. 9. The material of the rings 625, 626 is selected in such a way that they constitute a thermal insulator which impedes the transfer of heat between the friction surface 604a of the component 604 and the radial bearing 616. The bearing 616 is held against axial movement relative to the component 604 by the rings 625, 626 in that the ring 625 abuts the disc 630 and the ring 626 abuts an internal shoulder 631 of the component 604. As mentioned before, the rivets 629 fix the disc 630 to the component 604.

The damping unit 613 comprises the aforementioned disc 630 and a second disc 633. The discs 630, 633 are disposed at the opposite sides of a flange 632 and are held (by the rivets 629) against axial movement relative to each other and relative to the component 604. The flange 632 has windows (not specifically referenced) which register with windows in the discs 630, 633 and serve to receive energy storing elements in the form of coil springs 634. The coil springs 634 yieldably oppose angular movements of the flange 631 and discs 630, 633 relative to each other. The flange 632 is rotatable relative to the component 604, together with the component 603.

The friction generating device 613a can be said to constitute a part of the damping unit 613 and is designed to resist each and every angular movement of the components 603 and 604 relative to each other. This friction generating device is installed between the disc 630 and the component 603 and comprises an energy storing device in the form of a diaphragm spring 635 which reacts against the disc 630 and bears upon a ring 636. The ring 636, in turn, urges a washer 637 against the component 603. The force which is transmitted by the diaphragm spring 635 to the disc 630 is taken up by the radial bearing 616.

The flange 632 is the input member of the damping unit 613 as well as the output member of the damping unit 614. The input member of the damping unit 614 includes two axially spaced-apart discs 638, 639 which are non-rotatably secured to the component 603. The disc 639 is affixed to the component 603 by rivets 640. The periphery of the disc 638 is provided with integral projections in the form of axially extending lugs 638a which extend into complementary recesses 641 of the disc 639. This ensures that the discs 638, 639 can move axially toward and away from each other but cannot perform any angular movements with respect to one another. The flange 632 has radially extending arms or teeth 642 which are clamped between the discs 638 and 639. For this purpose, the discs 638, 639 are biased toward each other by a diaphragm spring 643. The spring 643 reacts against the component 603 and bears upon the disc 638 in a direction to urge the disc 638 toward the disc 639. The discs 638, 639 have windows which register with each other and with tooth spaces between the arms 642 and serve to receive energy storing elements in the form of coil springs 644.

In accordance with a feature of the invention which is shown in FIGS. 9 and 10, the component 604 is provided with axially extending passages 645 which are disposed between the bore 618 for the radial bearing 616 and the friction surface 604a of the component 604, as considered in the radial direction of the composite flywheel 602. The passages 645 serve to prevent the transfer of substantial quantities of heat from the friction surface 604a of the component 604 to the bearing 616.

As can be seen in FIG. 10, the passages 645 can constitute slots which are elongated in the circumferential direction of the component 604 and together form an annulus whose diameter 650 is smaller than the minimum diameter of the friction surface 604a but greater than the diameter of the surface surrounding the bore 618 of the component 604. The passages 645 are preferably adjacent, and most preferably closely adjacent, the bearing 616.

In accordance with a presently preferred embodiment of the invention, the cross-sectional areas of the passages 645 increase in a direction from a surface 646 radially inwardly of the friction surface 604a toward an additional surface 647 of the component 604 opposite the friction surface 604a. The surface 647 faces the damping units 613 and 614. The component 604 has internal surfaces which surround the passages 645 and each of which includes a first or inner portion 648 nearer to the common axis of the components 603, 604 and extending in at least substantial parallelism with such axis, and a second or outer portion 649 which is more distant from the common axis of the components 603, 604 and diverges radially outwardly away from the common axis toward the periphery of the component 604. At least a portion of each surface portion 649 has a substantially convex outline as can be readily seen in the lower portion of FIG. 9. The shallow leftmost portion of each passage 645 is provided in the second surface 647 of the component 604 and extends radially at least along a portion (x) of the width of the friction surface 604a as considered in the radial direction of the flywheel 602. The surfaces bounding the passages 645 resemble those of air circulating vanes or blades on an air impeller and cause streams of air to flow through the passages 645 in a direction from the friction surface 604a toward the additional surface 647 of the component 604. This entails a pronounced cooling of the entire flywheel 602 and greatly reduces the amount of heat which is transmitted from the friction surface 604a to the bearing 616. Thus, that portion of the component 604 which is formed with the passages 645 can be said to constitute a thermal barrier which impedes the transfer of heat from the surface 604a to the antifriction bearing 616. In addition, streams of air flowing through the passages 645 effect a substantial cooling of component parts of the damping means 613, 614, 613a because such streams flow along the discs 633 and 639 and a portion of each such stream can escape, for example, through the windows of the discs 630, 633 and flange 632. As mentioned before, such windows are provided for the energy storing springs 634.

FIG. 10 shows that the rivets 629 form an annulus whose diameter equals or approximates the diameter 650 of the circle formed by the annulus of passages 645. FIG. 10 further shows that each fastener 629 alternates with pairs of slit-shaped passages 645 which have identical lengths. The length of each of the webs 652 through which the fasteners 629 extend exceeds the length of a passage 645. For example, the length of a web 652 (as measured in the circumferential direction of the component 604) can be between 0.5 and 2.5 times the length of a passage 645. In the embodiment which is shown in FIGS. 9 and 10, the component 604 is provided with two sets of webs, namely the aforementioned relatively long webs 652 which carry the rivets 629 and shorter webs 651 which alternate with the longer webs 652. Any heat which is generated at the friction surface 604a and is to reach the antifriction bearing 616 must be transmitted through the webs 651 and 652. Such webs can be said to constitute small heat barriers because they are being cooled by streams of air flowing through the passages 645. That (innermost) portion of the component 604 which defines the bore 618 and surrounds the radial bearing 616 is denoted by the character 653. The portion 653 is surrounded by the annulus of passages 645 and by the webs 651 and 652 of the component 604. The length of a web 652 can equal or approximate the combined length of two shorter webs 651 (as measured in the circumferential direction of the radially innermost portion 653 of the component 604). The length of a passage 645 can equal or exceed (at least slightly) the length of a shorter web 651.

The combined length of the passages 645 (in the circumferential direction of the component 604) can be between 20 and 70% of the total length of the corresponding portion of the component 604. In the embodiment of FIGS. 9 and 10, the combined length of the passages 645 can be at least 50% of the circumferential length of the corresponding portion of the component 604. In other words, at least one-half of the circle whose diameter is shown at 650 can extend through the passages 645.

It is also within the purview of the invention to increase the length of the passages 645. For example, if the radial bearing 616 can stand reasonably pronounced thermal stresses, or if the transmission of pronounced thermal stresses is impeded in another way, the length of the illustrated passages 645 can be increased as shown in FIG. 10 at 654, i.e., the shorter webs 651 can be omitted so that the rivets 629 alternate with relatively long passages each of which can extend along an arc in excess of 45 degrees. For example, the component 604 can be provided with four relatively long passages 645 which alternate with four webs 652, and each web 652 is traversed by at least one fastener in the form 35 of a rivet 629.

Since the webs 651 and/or 652 constitute relatively narrow portions of the component 604 and alternate with passages 645, they act not unlike restrictors or throttles to the transmission of heat from the friction surface 604a toward the bearing 616. Thus, the corresponding portion of the component 604 is cooled by streams of air flowing through the passages 645, and the webs 652 constitute restrictors in that they oppose the transmission of heat to the radial bearing 616 so that the useful life of such bearing is much longer than in conventional apparatus. In view of the aforediscussed distribution of material of the component 604 in the region of the circle whose diameter is shown at 650, and in view of the distribution of passages 645 in the form of an annulus which is disposed between the friction surface 604a and the radially innermost portion 653 of the component 604 (i.e., radially outwardly of the bearing 616), heat which is generated in response to engagement of the friction clutch 607 can entail some rise in the temperature of the radially innermost portion 653 but not to a value which could entail damage to the bearing 616. The feature that the bearing 616 is not subjected to excessive thermal stresses is attributable, to a considerable extent, to the fact that the major part of the mass of the component 604 is located radially outwardly of the passages 645.

The placing of rivets 629 into the webs 652 exhibits the advantage that the rivets dissipate substantial quantities of heat which would otherwise pass through the webs 652 and into the radially innermost portion 653 of the component 604. Moreover, the rivets 629 transmit heat to the discs 630, 633 which dissipate such heat into the surrounding atmosphere. In other words, the rivets 629 ensure that a substantial percentage of heat which would have passed through the webs 652 and into the portion 653 is transmitted to parts (630, 633) having large exposed surfaces to ensure rapid dissipation of transmitted heat to atmospheric air.

The heat barrier 624 including the rings 625, 626 constitutes an optional feature of the apparatus of FIGS. 9-10. Thus, if the bearing 616 is furnished with conventional sealing rings, the rings 625, 626 can be omitted and the bearing 616 can be fully assembled on the component 603 before the component 603 is assembled with the component 604. In such apparatus, the outer race 617 of the bearing 616 is or can be a press-fit in the bore 618 of the component 604. The just described mounting of the bearing 616 in the bore 618 (without the rings 625, 626) reduces the initial cost and simplifies the assembly of the apparatus 601.

The passages 645 are provided in addition to those passages which are desirable or necessary in the component 604 for other purposes, for example, to facilitate assembly of the apparatus 601 by providing paths for the tool which is to rotate the bolts 605 and/or other tools. It is also known to provide the components of a composite flywheel with openings for withdrawal of lubricant and for other purposes. The passages 645 are provided for the specific purpose of reducing the transfer of heat between the antifriction bearing which is interposed between the components of the flywheel and the friction surface of the component which comes into contact with the linings of the clutch plate 609. The passages 645 extend all the way between the surfaces 604a and 647 of the component 604 so as to ensure the aforedescribed desirable circulation of air streams and attendant cooling of the corresponding portion of the component 604 radially outwardly of the portion 653 which supports and surrounds the outer race 617 of the antifriction bearing 616. It has been found that the passages 645 contribute significantly to the useful life of the bearing 616 because the bearing is shielded from excessive thermal stresses which develop when the friction clutch 607 is actuated and which are likely to rapidly destroy the bearing in the absence of any remedial measures in addition to those which are already known in the art. The provision of passages 645 is particularly desirable in apparatus which employ antifriction bearings whose components are assembled with a minimum of play so that pronounced and rapid heating or cooling of such bearings could entail extensive thermally induced distortion and attendant jamming of the parts. In fact, such excessive thermally induced distortion can lead to seizing with immediate destruction of the bearing. The streams of air which flow through the passages 645 further ensure adequate cooling of lubricant for the rolling elements 616a of the bearing 616 regardless of whether such lubricant is oil or grease. Adequate cooling (or prevention of overheating) of the lubricant also prolongs the useful life of the bearing 616.

The passages 645 can be configurated in a number of different ways without departing from the spirit of the invention. It has been found that elongated passages in the form of arcuate slots are particularly advantageous because they ensure the flow of large quantities of air and reduce the combined length of webs 652 or webs 651, 652. The aforedescribed configuration of surfaces 648, 649 which surround the passages 645 is desirable and advantageous because such surfaces act not unlike the surfaces of vanes or blades-and ensure forced circulation of air in the region of the circle including the diameter 650. The placing of passages 645 close to the radially innermost portion 653 of the component 604 also contributes to a more reliable prevention of overheating of the bearing 616. The provision of relatively shallow recesses which are provided in the surface 647 and constitute the radially outermost portions of the passages 645 ensures that a large percentage of air which is heated during flow through the passages is caused to flow radially outwardly and away from the bearing 616. The surfaces surrounding the passages can be said to constitute a radial fan which draws air from the space radially inwardly of the friction surface 604a and causes streams of air to flow first axially and thereupon radially outwardly toward the periphery of the component 604. This effectively reduces the likelihood of flow of large quantities of heated air toward the bearing 616. The aforementioned configuration (convexity) of the surface portions 649 in the passages 645 also contributes to a desirable flow of heated air radially outwardly and away from the radially innermost portion 653.

While it is possible to provide the passages 645 in non-uniform or irregular distribution, a uniform or regular distribution is preferred at this time because it ensures predictable cooling of each and every portion of the component 604 in the region of the webs 651 and 652.

As mentioned before, the mass of the component 604 radially outwardly of the passages 645 is much larger than the mass of the radially innermost portion 653. Since the flow of heated air is radially outwardly, eventual heating of the major part of the component 604 radially outwardly of the passages 645 does not entail an overheating of the portion 653 and bearing 616.

The streams of air which flow through the passages 645 bring about a desirable cooling of the elements of the damping means 613, 613a, 614. This prolongs the useful life of such damping means and hence the useful life of the entire apparatus. Moreover, the streams of air can adequately cool the first component 603 of the composite flywheel 602.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Torque transmitting apparatus with means for taking up and for compensating for variations of torque, particularly for fluctuations of torque between a combustion engine and input means of a transmission, comprising at least two coaxial flywheels including first and second flywheels which are rotatable relative to each other, said first flywheel being connectable with the engine and said second flywheel being connectable with the input means of the transmission by way of a clutch plate of a friction clutch and having a friction surface engageable with the clutch plate with attendant generation of heat; damping means for opposing rotation of said first and second flywheels relative to each other;

and antifriction bearing means interposed between said first and second flywheels and including at least one annulus of rolling elements, said second flywheel further having a plurality of elongated circumferentially extending substantially axial passages adjacent said bearing means and disposed radially between said friction surface and said bearing means, the combined length of said passages in the circumferential direction of said second flywheel being at least 20 percent of the corresponding portion of said second flywheel, said first and second flywheels defining a space which communicates with said passages and has an open outer portion to establish a path for the flow of cooling air through said passages and said space.

2. The apparatus of claim 1, wherein said passages are slots.

3. The apparatus of claim 1, wherein said second flywheel has a first side including said friction surface and a second side opposite said first side, said passages extending between said first and second sides and including slot-shaped portions at said first side, the cross-sectional area of said passages increasing in a direction from said first toward said second side.

4. The apparatus of claim 1, wherein said second flywheel has surfaces bounding said passages and being shaped to induce air flow.

5. The apparatus of claim 1, wherein said second flywheel has a first side including said friction surface and a second side opposite said first side, said passages extending between said first and second sides and having end portions at said second side and extending substantially radially outwardly away from said bearing means.

6. The apparatus of claim 1, wherein said second flywheel has a first side including said friction surface, a second side opposite said first side, and internal surfaces bounding said passages, each of said internal surfaces having an inner portion nearer to the common axis of said first and second flywheels and extending in substantial parallelism with said axis, and an outer portion more distant from said axis and extending in a direction from said first side toward said second side and radially of and away from said axis.

7. The apparatus of claim 1, wherein said passages are substantially equidistant from each other in the circumferential direction of said second flywheel.

8. The apparatus of claim 1, wherein said passages are equidistant from the axis of said second flywheel.

9. The apparatus of claim 1, wherein the combined length of said passages in the circumferential direction of said second flywheel is between 20 and 70 percent of the corresponding portion of said second flywheel.

10. The apparatus of claim 1, wherein said second flywheel includes webs which alternate with said passages in the circumferential direction of said second flywheel, the width of said webs in the circumferential direction of said second flywheel being between 0.2 and 2.5 times the width of said passages.

11. The apparatus of claim 1, wherein said second flywheel comprises webs alternating with said passages and constituting heat barriers which oppose the transfer of heat from said friction surface toward said bearing means.

12. The apparatus of claim 1, wherein said damping means comprises circumferentially acting energy storing means and/or friction generating means or slip clutch means, output means and rivets non-rotatably connecting said output means with said second flywheel and alternating with said passages in the circumferential direction of said second flywheel.

13. The apparatus of claim 12, wherein said rivets and said passages are equidistant from the axis of said second flywheel.

14. The apparatus of claim 12, wherein said second flywheel includes webs which alternate with said passages, said rivets being provided in said webs.

15. The apparatus of claim 12, wherein said rivets alternate with pairs of passages.

16. The apparatus of claim 12, wherein said second flywheel has webs alternating with said passages and including wider and narrower webs, said rivets being provided in said wider webs.

17. The apparatus of claim 16, wherein the width of said wider webs is approximately twice the width of said narrower webs.

18. The apparatus of claim 1, wherein said bearing means further comprises a race which is adjacent said passages in the radial direction of said flywheels, said second flywheel further having a socket adjacent said race and further comprising a thermal barrier between said socket and said race, said thermal barrier including an insert disposed between said race and said socket and arranged to impede the transfer of heat from said friction surface to said bearing means.

19. The apparatus of claim 18, further comprising means for securing said first flywheel to the engine, said securing means being disposed radially inwardly of said bearing means and said passages.

20. The apparatus of claim 1, wherein at least a portion of said damping means is disposed between said first and second flywheels and said second flywheel has a first side including said friction surface and a second side opposite said first side, said passages extending between said first and second sides and defining paths for the flow of air from said first side to said second side, such air flowing in said space along said portion of said damping means and into said open outer portion.

21. Torque transmitting apparatus with means for taking up and for compensating for variations of torque, particularly for fluctuations of torque between a combustion engine and input means of a transmission, comprising at least two coaxial flywheels including first and second flywheels which are rotatable relative to each other, said first flywheel being connectable with the engine and said second flywheel being connectable with the input means of the transmission by way of a clutch plate of a friction clutch and having a friction surface engageable with the clutch plate with attendant generation of heat; damping means for opposing rotation of said first and second flywheels relative to each other; and antifriction bearing means interposed between said first and second flywheels and including at least one annulus of rolling elements, said second flywheel further having a plurality of substantially axial passages disposed radially between said friction surface and said bearing means and having cross-sectional areas increasing in a direction toward said first flywheel, the combined length of said passages in the circumferential direction of said second flywheel being at least 20 percent of the corresponding portion of said second flywheel, said first and second flywheels defining a space which communicates with said passages and has an open outer portion to establish a path for the flow of cooling air through said passages and said space.

* * * * *